United States Patent [19]

Pannier

[11] 4,412,290

[45] Oct. 25, 1983

[54] ELECTRONIC CONTROL DEVICE FOR CHANGING THE SPEED RATIOS IN AN AUTOMATIC TRANSMISSION OF AN AUTOMOTIVE VEHICLE

[75] Inventor: Gerard Pannier, Bois d'Arcy, France

[73] Assignee: Regie Nationale des Usines Renault, Boulogne-Billancourt, France

[21] Appl. No.: 171,092

[22] Filed: Jul. 22, 1980

[30] Foreign Application Priority Data

Jul. 24, 1979 [FR] France .................. 79 19104

[51] Int. Cl.³ .............. G05D 17/02; G06G 7/64; B60K 41/08
[52] U.S. Cl. .................. 364/424.1; 74/866
[58] Field of Search ........... 364/424, 431; 74/752 A, 74/866

[56] References Cited

U.S. PATENT DOCUMENTS

| | | | |
|---|---|---|---|
| 3,823,621 | 7/1974 | Kubo et al. ............ | 74/752 A |
| 3,938,409 | 2/1976 | Uozumi .................. | 74/866 |
| 4,034,627 | 7/1977 | Mizote ................... | 74/866 |
| 4,041,809 | 8/1977 | Dick et al. ............. | 74/866 |
| 4,073,204 | 2/1978 | Dick ...................... | 74/866 |
| 4,140,031 | 2/1979 | Sibeud et al. .......... | 74/866 |
| 4,274,306 | 6/1981 | Yokoi et al. ........... | 74/866 |
| 4,290,324 | 9/1981 | Aubert et al. .......... | 74/866 |
| 4,294,341 | 10/1981 | Swart .................... | 74/866 X |

FOREIGN PATENT DOCUMENTS

| | | |
|---|---|---|
| 1397442 | 3/1965 | France . |
| 88608 | 5/1965 | France . |
| 1457550 | 9/1965 | France . |
| 90531 | 5/1966 | France . |
| 2076715 | 10/1971 | France . |

Primary Examiner—Felix D. Gruber
Attorney, Agent, or Firm—Owen, Wickersham & Erickson

[57] ABSTRACT

An electronic governor receiving two signals, one corresponding to the load on the motor and the other to the speed of the vehicle comprises two time-interval comparators controlled by two switches corresponding to the manual control imposing transmission ratios and by a retrocontact switch. The output signals of the governor supplying orders for speed changes feed a sequential commutation device which controls two electrically actuated valves controlling the gear box with time delays and for transitory changes.

28 Claims, 19 Drawing Figures

FIG. 2

| | P | PR | N | A | | | 2 | | 1 | A or Ā→2 | |
|---|---|---|---|---|---|---|---|---|---|---|---|
| | | AR | | 1 | 2 | 3 | 1 | 2 | 1 | 2/3 | 3→2 |
| EL₁ | 0 | 0 | 0 | 0 | L | 0 | 0 | L | 0 | L | L |
| EL₂ | 0 | L | 0 | L | L | 0 | L | L | L | 0 | 0 |
| E₁  | L | 0 | L | L | L | L | L | L | L | L | L |
| E₂  | 0 | L | 0 | 0 | 0 | L | 0 | 0 | 0 | 0 | 0 |
| F₁  | 0 | L | 0 | 0 | L | 0 | 0 | 0 | L | 0 | 0 |
| F₂  | 0 | 0 | 0 | 0 | L | 0 | L | 0 | 0 | L | L-0 |

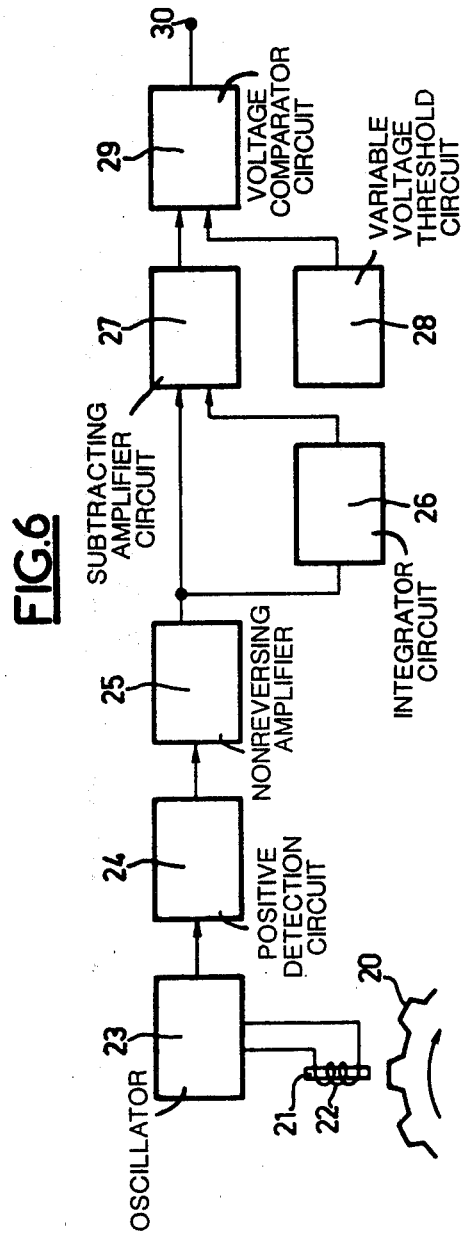
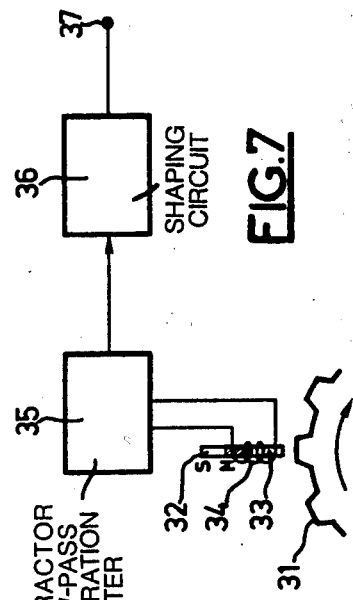
FIG.6
FIG.7

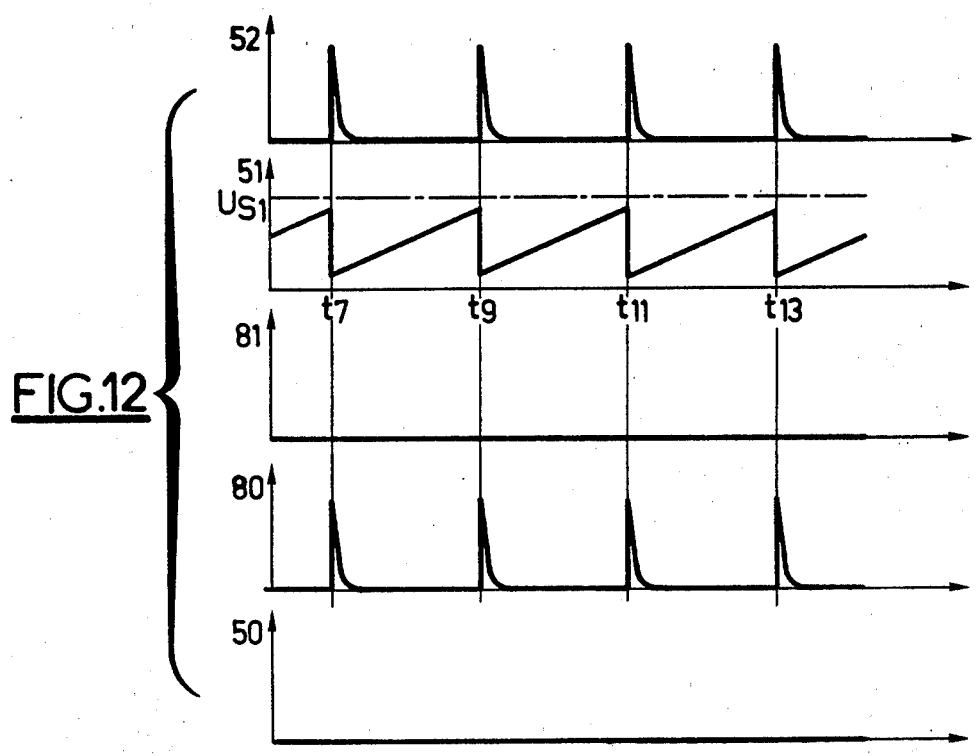

ELECTRONIC CONTROL DEVICE FOR CHANGING THE SPEED RATIOS IN AN AUTOMATIC TRANSMISSION OF AN AUTOMOTIVE VEHICLE

The present invention relates to an electronic control device for changing the speed ratios in an automatic transmission of an automotive vehicle.

REFERENCE TO RELATED APPLICATION

U.S. application Ser. No. 79,918, filed Sept. 28, 1979, now U.S. Pat. No. 4,290,324 shows an apparatus for controlling an automatic transmission employing an electronic control device of the present invention.

BACKGROUND OF THE INVENTION

This type of electrohydraulic automatic transmission, comprising for example three forward ratios with shifting under torque and one reverse ratio, generally utilizes the combination of a power train and a low energy level control-train. The power train which transmits the energy from the drive motor of the vehicle to the driving wheels comprises in particular a hydrokinetic coupling converter whose function is to insure flexible connection between the motor and the transmission mechanism. The power train also comprises a gear box with one or several epicyclic gear trains actuated by a set of gears and hydraulically controlled brakes. In an automatic transmission with three forward ratios, the gear box thus comprises a train of epicyclic gears actuated by two gears and two hydraulically controlled brakes. The gears and the brakes are fed by a hydraulic assembly controlled by electrically actuated valves, two in number in the case of a transmission with three forward ratios; these provide the desired combinations of the pinion assembly, so as automatically to obtain the different speed ratios of the transmission.

The low-energy control, associated with the power train, selectively feeds the electrically actuated valves with signals that are a function of information concerning the running or operation of the vehicle equipped with the transmission and a function of the driver's decisions.

One example of information depending on the operation of the vehicle, is the position of the accelerator pedal, which corresponds to the load placed on the drive motor of the vehicle as well as the speed of the vehicle. The driver's decisions may be represented in particular by the position of a manual control member which allows the imposition of certain transmission ratios and an end-of-the-course contact of the accelerator pedal, a so-called "retrocontact" permitting the transmission ratios to be retrograded by imposition. The actions controlled by the driver act on the automatic system only at certain speed levels of the vehicle so as to insure the mechanic stability of the gear box.

Electronic control devices of this type are already known using as a parameter the speed of the vehicle and utilizing for this purpose a tachometer type of pickup from the automatic gear box. In these known devices, the speed detectors of the vehicle are rotationally connected with any output shaft of the automatic transmission. Reference is made in particular to French Pat. No. 1,397,442 and its additions Nos. 88,608 and 90,531 entitled "Alternator with rotating magnet and adjustable voltage, applicable in particular to power transmission control in automobiles", to French Pat. No. 1,457,550 entitled "control governor as a function of the frequency and of at least one axiliary parameter", as well as to French Pat. No. 2,076,715, entitled "Improvements in governors for automatic gear boxes".

All these known devices have the disadvantage of increasing the space taken up by the automatic transmission and thereby making it difficult to install the motor-propulsion unit, including the transmission in a transverse position, in relation to the longitudinal axis of the vehicle.

An object of the present invention is therefore to replace the speed detector devices of the known type of a direct tap of the speed information of the vehicle onto an existing member of the gear box having on its periphery regularly spaced teeth. It may, for example, be an output pinion of the gear box, or of a parking wheel or of an equivalent member rotating at a speed proportional to the speed of the vehicle. In accordance with the invention, speed detection may then be accomplished by means of an electromagnetic proximity pickup located a short distance from the rotating member the speed of which is to be determined. This arrangement makes it possible to reduce considerably the space required by the automatic transmission by permitting the propulsion/transmission unit to be mounted either longitudinally or transversely in relation to the vehicle and to function equally well in either position.

In the electronic control devices of known type for automatic gear boxes the principal function of the electronic unit is to decide the speed ratios to be engaged, while the function of carrying out the speed ratio changes is left to hydraulic devices. Reference is made in particular to French Pat. No. 1,453,300 entitled "Voltage control device particularly for changing the ratio in an automatic vehicle transmission", No. 1,457,550 entitled "Governor for control as a function of the frequency and at least one axiliary parameter", No. 1,520,662 entitled "Improvement in electric control devices for gear boxes" and No. 2,076,715 entiled "Improvement in governors for automatic gear boxes".

SUMMARY OF THE INVENTION

In contradistinction to these known techniques, the present invention makes it possible to incorporate into the electronic unit decision functions as to the speed ratios and ratio changes, so as to accomplish speed changes without shocks by sequential control of the transitory coupling phases.

A further object of the invention is an electronic control device for changing the speed ratios of this type, in which detection of the information corresponding to the load of the drive motor is accomplished by a displacement pickup of the accelerator which is small in size and can therefore be easily integrated with the connection between the accelerator and the carburetor or any other equivalent member. In an embodiment where the motor load detector is placed directly on the carburetor, it furnishes an information image of the angular position of the butterfly of the carburetor which may be used for monitoring, simultaneously with the automatic transmission, and the vehicle speed control and regulating devices, by regulating the position of the butterfly or any other device necessitating such information.

The present invention provides an electronic control unit for an automatic transmission of an automotive vehicle having first, second and third forward drive. The control unit receives information signals relating to the operation of the vehicle and corresponding to (1) the load on the motor and (2) the speed of the vehicle.

This new control unit comprises first time-interval comparator means for supplying a first signal for the control of shifting from the first forward drive to the second forward drive and vice versa, and second time-interval comparator means for supplying a second signal for the control of the shifting from the second forward drive to the third forward drive and vice versa. Each of these comparator means compares the length of the period of the signal corresponding to the speed of the vehicle with the duration of the signal corresponding to the load on the motor.

The electronic device of the invention permits the change of speed ratios for an automatic transmission of an automotive vehicle, particularly of the type comprising three forward ratios with shifting under torque and a reverse drive. The transmission is controlled by a hydraulic circuit comprising in this case two electrically actuated control valves. The electronic control device receives information depending on the operation of the vehicle and in particular on the position of the accelerator pedal corresponding to the motor load, of the vehicle speed, of the position of a manual control member imposing certain transmission ratios, and of an end-of-the-coarse retrocontact of the accelerator pedal. In accordance with the invention, the electronic control device comprises in combination an electronic governor device receiving the abovementioned information and supplying a signal to change over from the first transmission ratio to the second ratio, and vice versa, a signal of change from the second ratio to the third ratio and vice versa, and a signal whose frequency corresponds to the speed of the vehicle; and a sequential commutation device receiving the signals emitted by the above-mentioned electronic governor device and furnishing a first control signal for the first electrically actuated control valve of the hydraulic circuit with a constant time delay $\Delta t_1$ and a second control signal for the second electrically actuated valve of the hydraulic circuit with a variable time delay $\Delta t_2$ whose duration depends respectively on the position of the accelerator pedal and of the speed of the vehicle. This second time delay insures a variable duration of the transitory state of the hydraulic control device for passage of the third forward ratio to the second forward ratio of the transmission, leaving to the drive motor of the vehicle the time to attain the suitable synchronism speed.

The electronic governor device preferably comprises two time-interval comparators. The first time-interval comparator supplies a signal for controlling the shift from the first transmission ratio of the transmission to the second ratio and vice versa. The second time-interval comparator furnishes a signal for controlling passage from the second ratio of the transmission to the third ratio and vice versa. Each interval comparator compares the duration of a signal corresponding to the vehicle speed with the duration of a reference signal corresponding to the load on the motor.

The electronic governor device is further controlled by two switches whose position depends on that of the manual control member of the transmission and which permits selection respectively of the first ratio of the transmission and the first or second ratios of the transmission. A retro-contact switch may also act on the electronic governor device. These three switches have a direct effect on the two time-interval comparators.

Each of the time-interval comparators receives the output signal of a current generator connected to a pickup of the load on the drive motor. The current generator cooperating with the first such comparator controlling shifting from the first ratio of the transmission to the second ratio and vice versa is further connected to the switch imposing the first ratio.

The pickup of the position of the accelerator pedal is preferably a potentiometer rotationally driven by the axle of the carburetor butterfly.

In a preferred embodiment of the electronic device of the invention, the speed of the vehicle is detected by means of a pickup of the displacement of a toothed ferromagnetic rotating member whose rotation is representative of the speed of the vehicle. Detection is accomplished with the aid of an induction coil placed near the rotating member and supplied with high-frequency alternating current. The electronic circuit associated with the pickup is adapted to carry out positive detection followed by a non-reversing amplification.

In another advantageous embodiment, the pickup of the displacement of the rotating member comprises a permanent magnet in contact with a soft iron core, the assembly being partially covered by a winding and placed near the teeth of the rotating member with a slight air-gap so as to obtain an electromotive induction force in the winding.

In these two cases, the displacement pickup is preferably associated with a processing circuit comprising an integrator device furnishing the mean value of the amplified low frequency signal and a differential amplifier whose two inputs are fed respectively by the amplified low frequency signal and by said mean value. A threshold detector connected to the amplifier furnishes a rectangular signal or square wave.

The square wave coming from the speed detection pickup of the vehicle preferably feeds a frequency divider and differentiator device connected on the other hand to the two above-mentioned time-interval comparators. In accordance with the invention, the ratio of frequency division is equal to the number of teeth of the toothed rotating member which cooperates with the displacement pickup detecting the speed of the vehicle. It is thus possible to eliminate the possible influence of the imperfections of the indentation or of the teeth of the above-mentioned rotating member.

The two time-interval comparators may be made by means of elements known per se and each preferably comprises a time generator/comparator which compares the duration of the signal representing the speed of the vehicle with the duration of a signal which it itself generates and which is proportional to a voltage furnished by a threshold generator and inversely proportional to the amperage of a current generator controlled by the signal corresponding to the load on the drive motor. Each of these two time-interval comparators further comprises a bistable flip-flop memorizing the result of the comparison. Each further comprises a locking gate cooperating with the switches that are connected to the manual control member so as to impose a determined output for the flip-flop as well as a hysteresis control device which makes it possible to obtain determined laws of speed changes.

In an advantageous embodiment, the flip-flop of the two respective time-interval comparators are connected with each other so that the control impulses of the flip-flop of the second comparator which controls the change from the second ratio to the third ratio and vice versa may also control the first comparator in the event that the control impulses of the latter should be of too low an amplitude to restore the flip-flop to its proper position following an accidental change of condition, due for example to the presence of parasitic currents or to a cutoff of the feed voltage.

The sequential commutation device of the two electrically actuated valves controlling the hydraulic control device and associated with the electronic governor comprises a first processing circuit for the two threshold shifting signals of the forward ratios emitted by the electronic governor and furnishing a first control signal for the first electronically actuated valve with a first constant time delay. This first signal insures a relatively short and constant duration regardless of the operation of the vehicle for the transitory condition of the hydraulic control device during shifting from the second ratio to the third forward ratio. The sequential commutation device further comprises a second processing circuit for the threshold signals of the shifting of speed ratios issuing from the electronic governor. The second processing circuit also receives the signal as a function of the accelerator pedal and the frequency signal as a function of the speed of the vehicle processed by the electronic governor. The second processing circuit furnishes a second control signal for the second electronically actuated valve with a second time delay whose duration is variable as a function of the signals depending respectively on the position of the accelerator pedal and of the speed of the vehicle. This second time delay makes it possible to provide a variable duration of the transitory conditions of the hydraulic control device for shifting from the third ratio to the second forward ratio, leaving to the driving motor of the vehicle the necessary time to attain the suitable synchronism speed.

The electronic control device in accordance with the invention preferably comprises, for each of the electrically actuated control valves of the electronic device, a power stage receiving the corresponding output signal of the sequential commutator device. Each of the power stages preferably comprises a power transistor whose charge, placed between the emitter and the feed power supply, is constituted by the coil of the respective electrically actuated valve. The collector of the power transistor is connected to circuit ground, and its base is connected to the output of an amplifier with parallel interposition of a resistance connected to the power supply source. It is thus possible to facilitate cooling of the power transistors of each of the two power stages and to avoid the installation of a booster diode which is generally used and mounted in parallel on each electrically actuated control valve in order to insure protection of the corresponding power transistor.

Other objects and characteristics of the invention will appear in reading the detailed description of several embodiments given without limitation and illustrated in the attached drawings.

BRIEF DESCRIPTION OF THE DRAWINGS

FIG. 2 is a summary table showing, according to the position of the speed selection lever and the engaged ratio, the conditions of the two electrically actuated control valves as well as the condition resulting therefrom for the two gears and two brakes of the transmission;

FIG. 6 is a generalized block diagram of a first embodiment of the assembly of the speed detector of the vehicle;

FIG. 7 is a similar diagram of a second embodiment of the speed detector of the vehicle;

FIGS. 10 to 13 are graphs showing the development in time of the waveforms obtained at various points of the circuit of FIG. 9, in various cases of the functioning of the automatic device;

Figure 1:
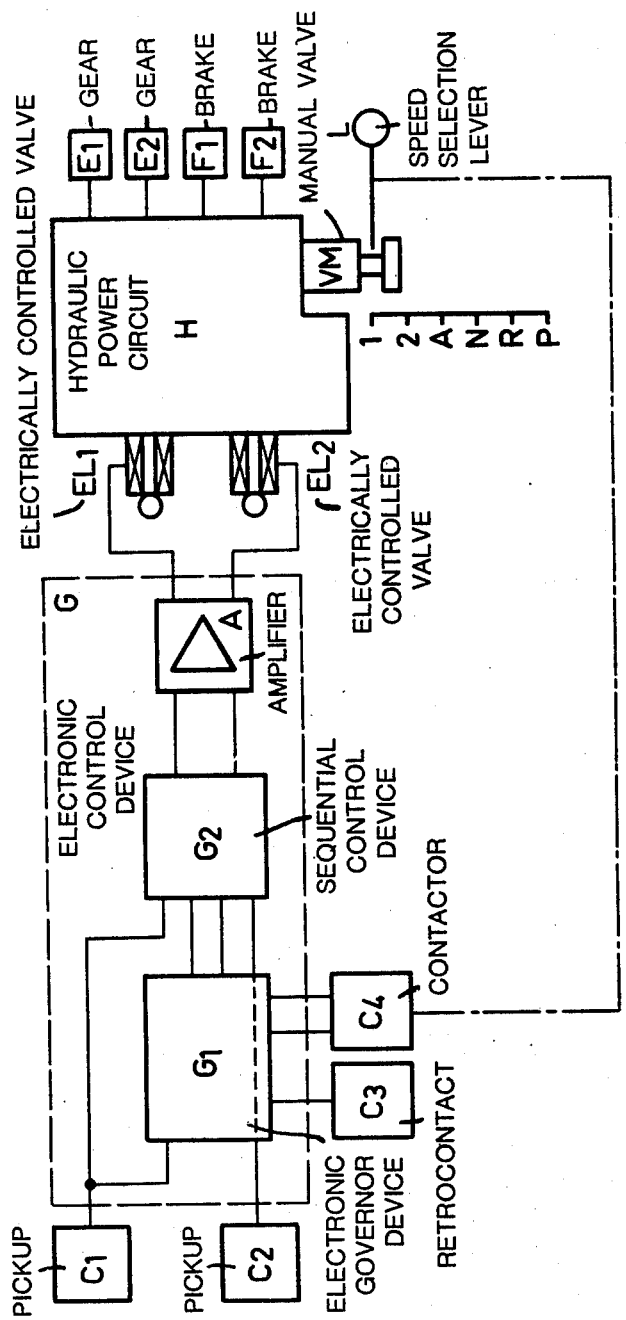
FIG. 1 is a block diagram of the arrangement of the essential control members of an automatic transmission with three forward ratios and a reverse, comprising an epicycloidal gear train actuated by two gears and two hydraulically controlled brakes.

Description of Preferred Embodiments of the Invention Essential control members of an automatic transmission (FIGS. 1 and 2).

As shown in FIG. 1, the control elements of the automatic transmission with three forward ratios and one reverse comprise a hydraulic power circuit H for feeding hydraulic fluid to two gears $E_1$, $E_2$ and two brakes $F_1$ and $F_2$ which actuate the epicycloidal gear train of the transmission, not shown in FIG. 1. The hydraulic circuit H is controlled by a manual valve VM mechanically connected to the speed selection lever L and, through two electrically controlled valves $EL_1$ and $EL_2$ which are, for example, of the type comprising a ball made of magnetic material, moving between two positions under the action of an electromagnetic coil. An electronic control device G receives (1) from a pickup $C_1$ information as to the position of the accelerator of the vehicle, which is the image of the stress required from the motor, (2) from a pickup $C_2$ information on the speed of the vehicles, (3) from a retrocontact $C_3$ located at the end of the course of the accelerator pedal retrogradation requirements of the ratios made by the driver, and (4) from a contactor $C_4$ mechanically connected to a speed selection lever L, information on the shift positions 1 and 2 controlling respectively the functions "first imposed speed" and "third prohibited speed" (first and second only authorized).

The control device G comprises an electronic governor device $G_1$ which supplies electric commands for speed ratios selection to a sequential commutation device $G_2$ starting from the combination of the signals of the detectors $C_1$ to $C_4$. The sequential control device $G_2$ of the transitory coupling phases insures the execution of flexible ratio changes, as a function of the information about the speed of vehicle after processing by the device $G_1$ and the position of the accelerator derived from the pickup $C_1$.

The two output signals of the device $G_2$ are applied after power amplification by the amplifier A to the electrically controlled valves $EL_1$ and $EL_2$ which insure the electrohydraulic interface between the control device G and the hydraulic unit H.

Reference is made to FIG. 2 to indicate the respective states of the two electrically controlled valves $EL_1$ and $EL_2$ according to the position of the selection lever L and according to the engaged ratio of the transmission. The notation "O" signifies that the corresponding electrically controlled valve is not actuated while the notation "L" signifies that the corresponding electrically controlled valve is actuated. It will be noted that the three forward drive ratios 1, 2, and 3, the reverse drive AR and the dead center positions N and stop with "parking" lock P are obtained by means of three states of the two valves $EL_1$ and $EL_2$. The transitory states corresponding to the shift up from the second to the third ratio and inversely to the shift down from the third to the second ratio, are obtained by means of the fourth possible state of the two electrically actuated valves.

FIG. 2 also shows the state of the two gears $E_1$, $E_2$ and of the two brakes $F_1$, $F_2$ of the transmission for each configuration of the two valves $EL_1$, $EL_2$. The notation "O" here signifies that the corresponding element is not supplied with hydraulic fluid and is therefore not applied, while the notation "L" here signifies that the corresponding element is supplied with hydraulic fluid and finds itself applied.

Figure 3:
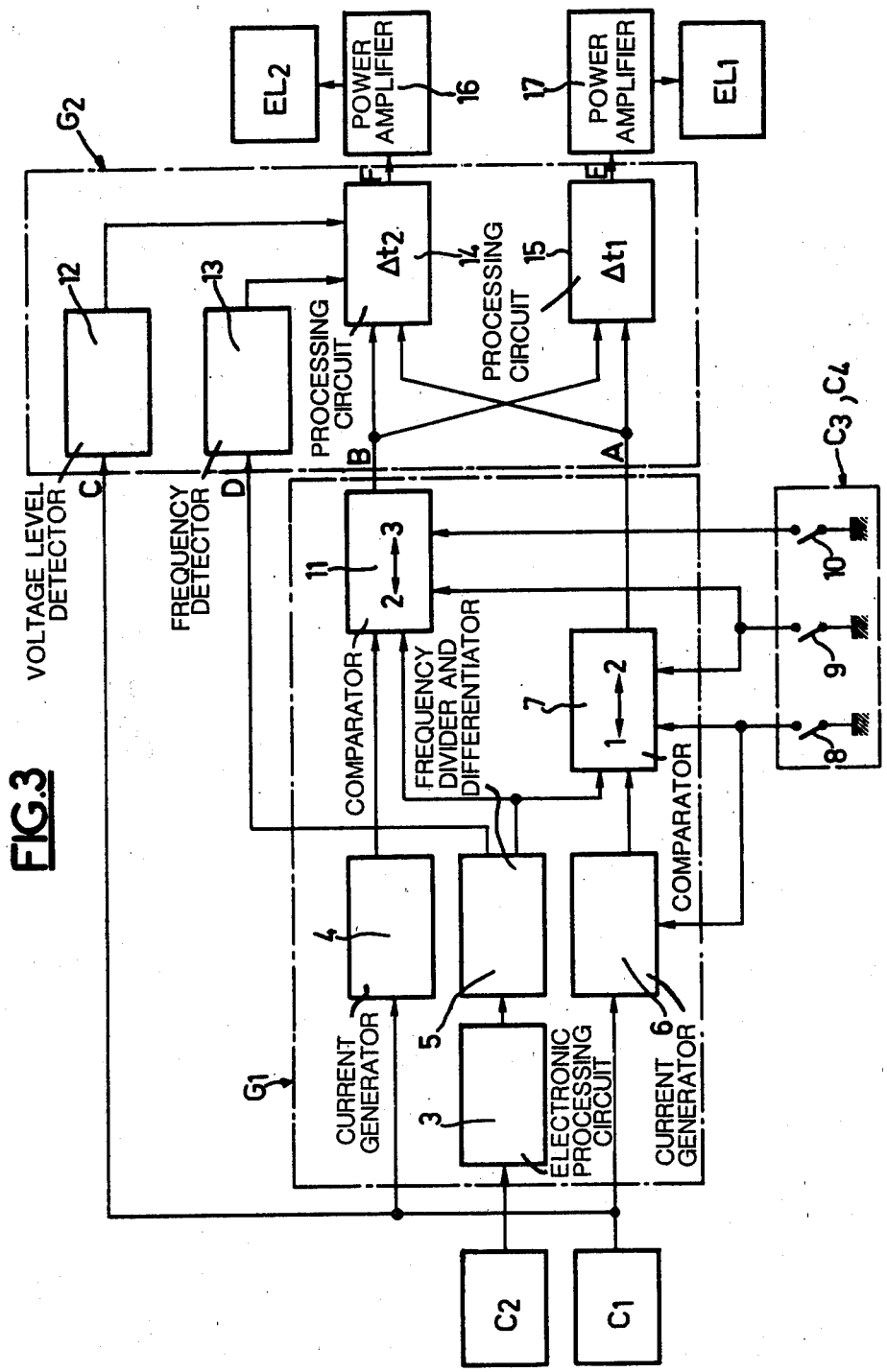
FIG. 3 is a simplified block diagram of an electronic control device for changes of speeds in accordance with the invention.
Figure 4:
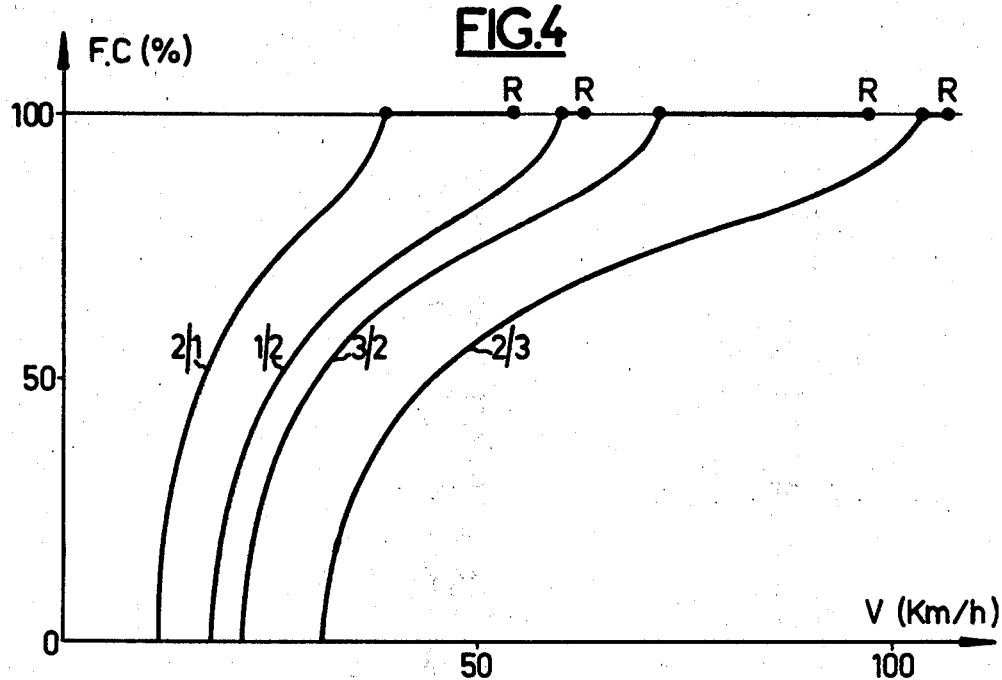
FIG. 4 is a graph illustrating an example of the rules for speed changes in the automatic functioning mode of the transmission.
Figure 5:
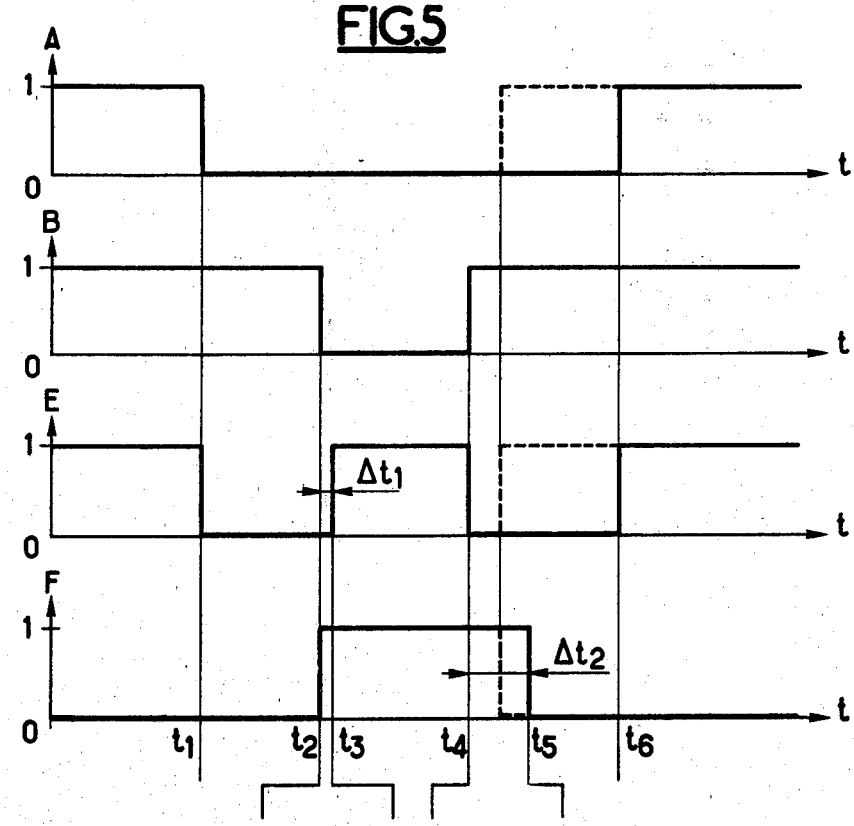
FIG. 5 is a diagram of the waveforms at the inputs and outputs of the sequential commutator device of the control assembly of FIG. 1.

Simplified explanation of the electronic control device (FIGS. 3-5).

In the assembly of the device shown in FIG. 3, the elements $G_1$ and $G_2$ of the governor G appear again and are as described in FIG. 1. The device $G_1$ is composed of a time-interval comparator 7 controlling shifts from the first to the second transmission ratio of increasing speed, or from the second ratio to the first ratio of decreasing speed, and from a time-interval comparator 11 controlling shifts from the second to the third transmission ratio of increasing speed or from the third ratio to the second ratio of decreasing speed. It will be noted that the speed shift thresholds must show a hysteresis between the shifts by increasing and by retrograding the ratios necessary for the functioning stability of the automatic mechanism.

The two time-interval comparators 7 and 11 compare the duration of the period of the signal coming from a frequency divider and differentiator 5 which receives tachometric information from the vehicular speed pickup $C_2$ through an electronic processing circuit 3 with the duration of the reference signals self-generated by the two comparators 7 and 11 as a function of the intensities supplied by current generators 4 and 6 controlled by the motor load pickup $C_1$. The two comparators 7 and 11 further receive the electric information coming from three switches 8, 9, and 10 corresponding to the information from the retrocontactor $C_3$ and the contactor $C_4$ of FIG. 1. The closure of the retrocontact notch 9 at the end of the course of the accelerator pedal causes decrease of the duration of the two previously cited reference times. Operation of the gear selection lever acts on the interrupters 8 and 10. The position "2" of the selection lever L corresponding to the condition "third speed prohibited" triggers closure of the switch 10 which positively places the time-interval comparator 11 in the state corresponding to the second transmission ratio. The position "1" corresponding to the condition "first imposed speed" triggers closure of the switches 8 and 10 which, through the intermediary of the contact 8, and as a measure of operational safety, places the time-interval comparator 7 into the state corresponding to the first ratio of decreasing speed only when the vehicular speed is lower than a limit threshold obtained by the control of the current generator 6, so that engagement of the first ratio will be without danger to the mechanical stability of the automatic transmission, and continues to maintain this condition, even during acceleration, in order to obtain a motor braking effect.

The diagram of FIG. 4 reproduces an example of the rules of speed change in the automatic operation mode of the transmission, on which the three factors of controlling the shift thresholds are shown: vehicle speed V, load F.C., and the state of the retrocontact R.

The ratio changes occur each time that the operation point of the automatic mechanisms moving in the space speed load crosses one of the change-over curves limited by the "foot raised" and "foot down" positions of the accelerator corresponding to the extreme levels (0 and 100% of the load factor F.C.) of the motor load. The action of the retrocontact will be noted, which shifts the gear shift thresholds up to the point R toward the upper speeds in the "foot down" position of the accelerator (100% of F.C.). This action is particularly remarkable for the shift thresholds 3/2 and 2/1. The hysteresis will also be noted in FIG. 4 between the rising and descending shifts of the speed ratios.

In the device $G_2$ of FIG. 3, the output signals A and B of the time-interval comparators 7 and 11 are combined and delayed from the constant time $\Delta t_1$ by a processing circuit 15 which insures by the signal E the correct feed to the electrically actuated valve $EL_1$ through the intermediary of a power amplifier 17 according to the sequences given by the table of FIG. 2. A processing circuit 14 which is also connected to the two time-interval comparators 7 and 11 receives the two types of control information, receiving the signal C from the load pickup $C_1$ of a voltage level detector 12 and receiving the tachometric output signal D of the divider 5 from a frequency detector 13. The circuit 14 combines and delays by a variable duration $\Delta t_2$ the signals A and B of the two time comparators 7 and 11 as a function of the information of the two detectors 12 and 13 and supplies the signal F to control a power amplifier 16 and the signals emanating therefrom, the electrically actuation valve $EL_2$ following the sequences given by the table of FIG. 2.

Referring to FIG. 5, the development may be observed as a function of the time of the voltages of the various signals of the device $G_2$. The output signal E of the processing current 15 is at the high level when the signals A and B coming from the time-interval comparator 7 and 11 are both high; the output signal E of the treatment circuit 15 is at the low level when the signal A of the comparator 7 is at the low level and the signal B of the comparator 11 is high, it remains at the low level during a constant time $\Delta t_1$ counted starting from the descending slope (high level toward the low level) of the signal B of the time-interval comparator 11 when the signal A of the comparator 7 is at the low level and passes rapidly to the high value while the signals A and B of the comparators 7 and 11 remain at the low level.

The ouput signal F of the processing circuit 14 is at the high level when the output signal B of the time-interval comparator 11 is at the low level. It remains at the high level during a time $\Delta t_2$ counted starting from the rising slope (low level towards the high level) of the signal B of the comparator 11. The time $\Delta t_2$ is variable with the voltage of the signal C supplied by the motor load pickup $C_1$ which acts through the intermediary of the voltage level detector 12 and with the frequency of the tachometric output signal D of the divider 5 which acts through the intermediation of the frequency detector 13 shown in FIG. 3. The output signal F of the processing circuit 14 passes rapidly to the low value while the signal A of the time-interval comparator 7 is low and the signal B of the comparator 11 is high. The high level of the signal A of the comparator 7 imposes the low level of the output signal F of the processing circuit 14, as may be seen on the broken-line curves of FIG. 5.

It will be noted that passage of the output signal A of the time-interval comparator 7 from the high level to the low level corresponds to the shift from the first to the second ratio of the transmission. Change of the output signal B of the comparator 11 from the high level to the low level corresponds to the shift from the second to the third ratio. Under these conditions and according to the sequences given in the table of the FIG. 2, from the time zero up to the time $t_1$ of FIG. 5 the hydraulic control device is in a configuration corresponding to the first speed ratio. From the time $t_1$ to the time $t_2$, the transmission is on the second ratio. During the time $\Delta t_1$, that is, from $t_2$ to $t_3$ during the transition from the second to the third speed ratio, the hydraulic control device controlled by the two electrically actuated valves $EL_1$ and $EL_2$ in their fourth state is in a configuration corresponding to the transitory state. From the time $t_3$ to the time $t_4$ the transmission in on the third ratio. During the time $\Delta t_2$, that is, from $t_4$ to $t_5$, the two valves $EL_1$ and $EL_2$ are in the fourth state corresponding to the transitory stage of the passage from the third speed to the second speed. From the time $t_5$ to the time $t_6$, one is again in the second speed and, finally, past $t_6$ the transmission is again in the configuration of the first speed. In practice, the order of the speeds is always respected because in the device $G_1$ of FIG. 3 the low level of the output signal B of the time-interval comparator 11 can only be obtained when the output signal A of the period meter 7 is already low.

In the assembly of the device shown in FIG. 3, the motor load pickup $C_1$ may be obtained in a manner per se known with a rotating potentiometer equipped with a long-lived resistant track, for example of the "plastic conductor" type which also has a good behavior with regard to vibrations and microdisplacements of the cursor. It is preferably secured to the carburetor and is rotationally driven by the axle of the butterfly by means of a connection allowing for fault of alignment which may for example be done with a flexible coupling, with turnscrew and slit transmissions, with spring or rod connection and crank with radial play. It is left to the motor load pickup $C_1$ to produce the form of the rule of speed shifting. According to the magnitude of the number of variations of the shift rules to be produced and the possibility of utilizing the information corresponding to "the opening of the carburetor butterfly" for controlling devices other than that of the automatic transmission control, it may simply be a potentiometer with a functional curve which permits direct feeding of the current generators 4 and 6 of FIG. 3, or a potentiometer with a linear curve associated either to an electronic generator functioning to execute a non-linear transformation of the voltage collected on the cursor of the potentiometer or with a mechanical butterfly/-potentiometer cam connection.

The vehicle speed pickup $C_2$ shown in FIG. 3 is secured on the automatic transmission. In a preferred embodiment of the invention the body of the pickup passes through the wall of the gear casing of the gear box so that the sensitive element at its end is at a slight distance from the indentation of the toothed engagement wheel of the parking lock.

A FIRST EMBODIMENT OF THE SPEED DETECTOR (FIG. 6).

The first embodiment is shown in FIG. 6.

In this embodiment, the speed pickup is of the inductive type with high frequency feed. It comprises a coil 22 placed on a magnetic ferrite core 21 in the form of a cylindrical rod or of a cup. The pickup is supplied with high-frequency alternating current by an oscillator 23 which induces in the coil a magnetic leakage flux focused by the ferrite core 21 toward a toothed parking wheel 20. The presence of teeth in this field generates Foucault currents in their metallic mass which, by increasing the electric losses, diminishes the quality coefficient of the coil.

Passage of the teeth in front of the pickup is converted into variations of the amplitude of the high-frequency oscillation voltage collected at the terminals of the winding 22 by a positive detection circuit 24. The low frequency signal issuing from the circuit 24 is sent into a continuous-connection non-reversing amplifier 25 whose task it is to amplify simultaneously the continuous image component of the distance target/pickup and the low frequency alternate voltage image of the indentation of the parking wheel. The function of a substracting amplifier circuit 27 is to amplify the difference between the low-frequency detection signal amplified by the circuit 25 and its mean value issuing from an integrator circuit 26. In order to eliminate the appearance of parasitic pulses, the substracting amplifier circuit 27 is connected in such a manner that either when subjected to voltage or in the absence of movement of the target, the output level of the unit 27 is low when the pickup is located in front of one of the recesses of the parking wheel. The amplifier 27 is followed by a signal-forming circuit comprising a circuit 28 which generates a variable voltage threshold as a function of the feed voltage of the electronic device and a voltage comparator circuit 29. The latter compares the output signal of the amplifier 27 with the voltage threshold delivered by the circuit 28 and supplies, outside a wide range of variations of the distance between the pickup and the target, a rectangular output signal with steep fronts whose cyclic ratio, which is not influenced by the feed voltage, depends only on the indentation form of the target and the frequency is therefore the same as that of the passage of the teeth.

A second embodiment of the speed detector (FIG. 7).

In accordance with a second embodiment shown in FIG. 7, the speed pickup is of the variable-reluctance electromagnetic type. It comprises a permanent cylindrical magnet 32 in contact with a soft iron rod 33 and a winding 34 which partially covers the rod 33 and the magnet 32. The harsh changes of the pickup-to-target gap during each passage of the teeth of a target or parking wheel 31 produce variations of the magnetic field in the iron rod 33, influenced by the magnet 32, which generate in the an electromotive induction force in the winding 34. This electromotive force, which depends on the number of turns of the winding 34 and on the speed of the flux variation during passage of the teeth of the target 31, is an alternate periodic magnitude whose frequency is the same as that of the passage of the teeth of the parking wheel and whose amplitude is proportional to that frequency.

The signal issuing from the reluctance variation pickup is sent to an electronic device comprising an amplifier 35 of the type "subtractor and low-pass integration filter" and a shaping circuit 36. The double function of the amplifier 35 which has an amplification variable with the frequency of the input signals permits, in the range of speeds of the parking wheel, maintaining the amplitude of the output signal practically constant and eliminating the parasitic pulses which may accidentally appear on one, on the other, or on both connections connecting the pickup to its electronic processing device. The amplifier 35 is followed by a signal shaping circuit 36 which makes it possible to obtain at the output, in a wide range of variation of the pickup-to-target distance, a rectangular frequency with steep slopes 37, the frequency of which is the same as that of the passage of the teeth. The shaping circuit 36 may be obtained either simply by means of a "TRIGGER" circuit which compares the signal delivered by the amplifier 35 with a reference threshold, or in a more effective form, by means of circuits 26 to 29 of the diagram of FIG. 6 which amplify the difference between the image signal of the speed of the parking wheel and its mean value, then produce the rectangular form by comparison of the difference signal to a fraction of the feed voltage in order to obtain the output signal 37.

An embodiment of the time-interval comparators (FIGS. 8-13).

Figure 8:
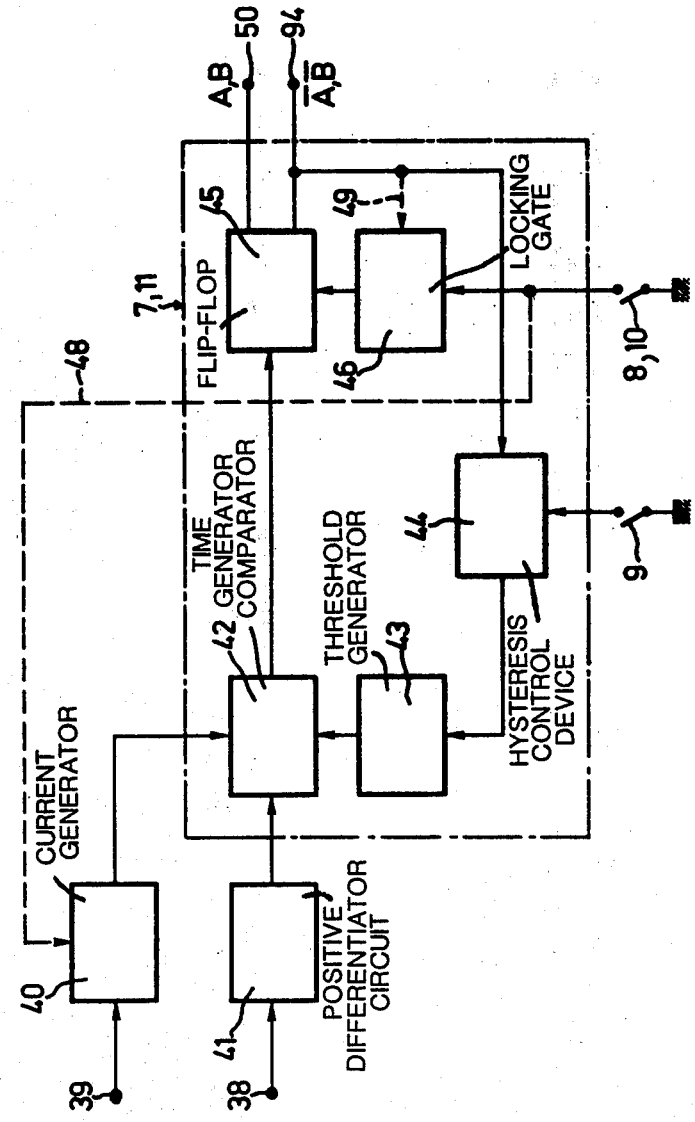
FIG. 8 is a generalized block diagram of an embodiment of the time-interval comparators employed in the device of the invention.

FIG. 8 is a generalized block diagram of an embodiment of the time-interval comparators 7 or 11 of FIG. 3. The connections common to the two comparators are indicated in a solid line. The broken-line connections correspond only to the comparator 7. Each comparator 7, 11 receives a certain amount of input information comprising: (1) the vehicle speed signal 38 coming from the frequency divider 5 of FIG. 3, (2) the motor load signal 39 coming from the potentiometric pickup C₁ of FIG. 3, (3) the position of the switch 9 of the retrocontact at the end of the course of the accelerator, (4) and the position of the switch 8 or 10 of the manual control imposing speed ratios. The output signal A or B appears in the form of a continuous voltage which can assume only two values corresponding respectively to the value "1" near to a reference voltage which represents a first ratio n, and the value "0" near to zero voltage, which represents a second ratio n+1, with transition fronts from the high level "1" toward the low level "0" during shifts up of the speeds and/or from the low level "0" toward the high level "1" during retrogradation shifting of the speeds which are very short in relation to the development period of shifts in the transmission ratios.

The time-interval comparator shown in FIG. 8 has already been the subject of partial descriptions in French Pat. No. 1,457,550 entitled "Control governor as a function of the frequency and of at least one auxiliary parameter" and No. 2,268,268 entitled "Multi-state tachometric circuit" to which reference may be made.

This device comprises a time generator-comparator 42 which compares the period of the vehicle speed signal 38 obtained by a positive differentiator circuit 41 to the duration of a signal self-generated by the unit 42 which is proportional to the value of the voltage given by a threshold generator 43 and conversely proportional to the amperage supplied by the current generator 40 controlled by a motor load signal 39. A flip-flop 45 connected to the output of the time generator-comparator 42 memorizes the result of the comparison, permitting pickup of the various speed ratios when a locking gate 46 controlled by the speed imposition switch 8 or 10 is open and allows it. In the case of the comparator 11 which controls the second and third transmission ratios, closure of the switch 10 through the intermediary locking gate 46 positively positions the flip-flop 45 into the "high" state of the output signal B which imposes the second ratio n+1 and maintains it so long as the switch 10 remains closed. In the case of the comparator 7, the control of the shift from the second to the first speed ratio caused by the closure of the switch 8, by a connection 48 shown in broken lines in FIG. 8 and which exists only for the comparator 11, annuls the effect of the motor load control 39 and imposes a value of the amperage of a current generator 40 whose block 42 produces a reference time such that retrogradation to the first ratio is possible only if, as a result of slowing down of the vehicle, the period of the speed signal is or becomes, superior to the threshold thus generated. When a shift to the first ratio is permitted, the output signal $\overline{A}$ becomes "high" and the complementary output A controls, by a connection 49 shown in broken lines in FIG. 8 and which exits only for the comparator 11, the locking gate 46 which locks the flip-flop 45 in the "high" state corresponding to the first transmission ratio, regardless of the speed of the vehicle, so long as the switch 8 remains closed.

A hysteresis control device 44 which controls the voltage of the threshold generator 43 starting from the output signal $\overline{A}$ or $\overline{B}$ and from the retrocontact switch 9 makes it possible to obtain, by modifying the reference time supplied by the unit 42, the necessary deviation between the shift points by raising or retrograding the ratios (see FIG. 4). Closure of the retrocontact switch 9 at the end of the course of the accelerator pedal reduces the hysteresis of the assembly by shortening the reference time supplied by the unit 42 during passage to a ratio of a lower order more than during passage to a ratio of a higher order.

Figure 9:
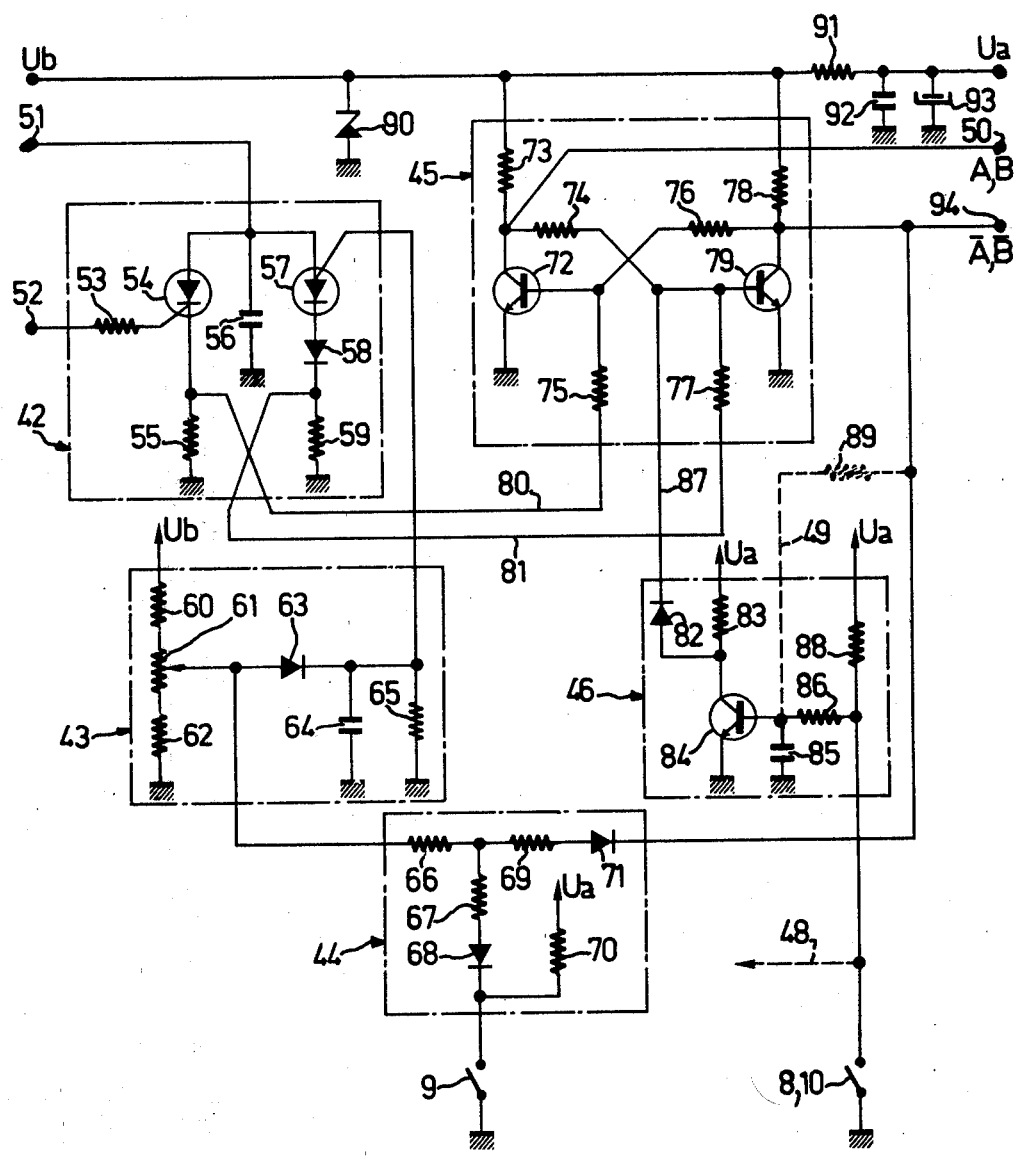
FIG. 9 is a detailed electrical-electronic diagram of a circuit capable of carrying out the functions illustrated in FIG. 8.

In the embodiment of FIG. 9 shown by the waveforms of FIGS. 10 to 13, the regulated feed voltage Ub of the circuit is available at the terminals of a Zener diode 90 which is connected to the voltage source Ua, on the side of the cathode across a resistance 91 and on the side of the anode by the ground of the circuit. The voltage Ua is uncoupled by a polyester-type condenser 92 and a high value electrochemical condenser 93 which attenuates the parasitic or static current coming from the feed source Ua.

The time generator-comparator 42 of FIG. 8 comprises a condenser 56 which becomes charged slowly by a connection 51 connected to the current generator 40 of FIG. 8. The condenser 56 can become charged rapidly in two different ways:

(1) The first way comprises a high maintenance current thyristor 54 which positively discharges the condenser 56 across a resistance 55 and the ground of the circuit at each period of a tachometric signal 38 of FIG. 8 when the positive shunt circuit 41 of FIG. 8 sends a positive pulse of short duration through a connection 52 onto the trigger of the thyristor 54 across a resistance 52.

(2) The second way comprises a low-current programmable single-junction transistor 57 which discharges the condenser 56 through a diode 58, a resistance 59, and the ground of the circuit each time that the charge voltage of the condenser 56 reaches the excitation voltage defined by the threshold generator 43 and the hysteresis control 44 of FIG. 8, which determine the potential of the gate of the single-junction transistor 57.

The threshold generator 43 is an adjustable voltage divider which comprises a potentiometer 61 enabling regulation of the excitation threshold, connected by a resistance 60 to the voltage Ub and by a resistance 62 to the mass of the circuit and whose cursor feeds, through a diode 63, which insures temperature compensation of the excitation threshold, the gate of the single-junction transistor 57 which returns to the mass through a resistance 65 and a condenser 64. The task of the condenser 64 is to suppress the short variations of the excitation voltage due to the accidental presence of parasitic pulses on the gate of the single-junction transistor 57.

The hysteresis control block 44 is connected to the cursor of the potentiometer 61 through a resistance 66 on the one hand to the retrocontact switch 9 by the series connection of a resistance 67 and a diode 68 and, on the other hand, to a terminal 94 whose electric state $\overline{A}$ or $\overline{B}$ is complementary to that of a terminal 50 of the output signal A or B, by a series connection of a resistance 69 and a diode 71. A resistance 70 placed between the voltage Ua and the common point of the diode 68 and the retrocontact switch 9 determines the potential of the cathode of the diode 68 when the retrocontact switch 9 is open.

The range of variations of the amperage of the current generator 40 which is a function of the motor load information 39 of FIG. 8 is selected so that the extreme values remain below the strong maintenance current of the thyristor 54 and above the weak maintenance current of the single-junction transistor 57. In this manner, the single-junction transistor 57 remains conductive after its excitation, preventing the condenser 56 from becoming recharged until the thyristor 54, becoming excited, bleeds to it a current which is sufficient to cause successively blocking of the single-junction transistor 57 and then of the thyristor 54. This operation is facilitated by the presence of the diode 58 in the discharge path of the single-junction transistor 57 which raises its anode potential by about 0.7 volt during its conduction phase. After locking of the two elements 54 and 57, the current coming from the generator 40 may then freely recharge the condenser 56.

According to whether or not the period of the tachometric signal on the terminal 52 permits the charge voltage of the condenser 56 to reach the excitation threshold of the single-junction transistor 57, a positive pulse, short and of high value, appears on one or the other of the resistances 55 and 59 and is sent onto one or the other of two control channels 80 and 81 of the flip-flop 45 which memorizes the result of the comparison up to the following period. The flip-flop comprises two transistors NPN 72 and 79 and resistances 73 to 78. From the collector of the transistor 72 (which is connected to the output terminal 50), current passes through a resistor 73 to the feed line Ub and through a resistance 74 to the base of the other transistor 79, while from the collector of the transistor 79 (which is connected to the terminal 94) current goes via a resistance 78 to the feed line Ub and via a resistance 76 to the base of the first transistor 72. The base of the transistor 72 receives via the connection 80 through the resistance 75 the pulses which appear at the common point of the resistance 55 and the cathode of the thyristor 54, while the base of the transistor 79 receives from the connection 81 through the resistance 77 the pulses which appear at the common point of the resistance 59 and the cathode of the diode 58, as well as from a connection 87 the control signal of the locking gate 46. The emitters of the transistors 72 and 79 are both connected to the common ground of the circuit.

The values of the resistances 74 and 76 are selected to be different, so that, when voltage is applied to the circuit, the transistor 72 becomes locked and the transistor 79 becomes saturated, and the output terminal 50 assumes the "high" level corresponding to a voltage close to Ub and the terminal 94 assumes the complementary state corresponding to the "low" level close to zero voltage.

The connection of the flip-flop is such that the transistor 72 remains locked and the transistor 79 remains saturated when the period of the tachometric signal on the terminal 52 is longer than the duration of the reference signal obtained when the charge voltage of the condenser 56 reaches the excitation threshold of the single-junction transistor 57; the voltage on the output terminal 50, thus, is "high" when the speed of the vehicle remains below the fixed shift threshold of the ratios. Conversely, in the absence of control of the locking gate 46, the transistor 72 is saturated and the transistor 79 locked when the period of the tachometric signal on the terminal 52 is such that the thyristor 54 discharges only the condenser 56, whose voltage cannot reach the excitation threshold of the single-junction transistor 57; the voltage on the output terminal 50 is thus "low" when the speed of the vehicle is higher than the fixed shift threshold of the ratios.

The frequency hysteresis necessary for reproducing the curves of FIG. 4 is insured by the control unit 44 described above which, in normal functioning when the retrocontact switch 9 is open, cuts off, by blocking the diode 71 when the voltage level of the terminal 94 becomes "high", the branched network in parallel comprising the elements between the cursor of the potentiometer 61 of the voltage divider and the ground of the circuit, through the intermediary two series resistances 66 and 69, of the diode 71 and of the collector/emitter junction of the transistor 79 which was then saturated. This results in an increase of the value of the excitation voltage of the single-junction transistor 57, the speed shifting threshold going from the value corresponding to the rise of the ratios to a higher value corresponding to their retrogradation. Closure of the retrocontact switch 9 causes lowering of the value of the excitation threshold of the single-junction transistor 57 by returning the common point of the resistances 66 and 69 to ground through the resistance 67 and the diode 68, which is rendered conductive and which, while the retrocontact switch 9 remains open, is closed by the inverse polarization applied by the resistance 70 connected to the feed voltage Ua. The choice of the value of the three resistors 66, 67 and 69 makes it possible to obtain the change of ratio thresholds corresponding to the "foot down" position in FIG. 4 (load factor 100%).

The switch 8 or 10 of the manual control which acts, in the case of the time-interval comparator 7, via the connection 48 on the current generator 40, not shown in FIG. 9, controls the locking gate 46 constructed around an NPN transistor 84. A resistance 88 connected to the voltage source Ua is branched to the parallel assembly comprising the switches 8 and 10 and a resistance 86 connected to the base of the transistor 84. The emitter of the transistor 84 is returned to the switch 8, 10 through the ground of the circuit, and the collector, fed by the voltage Ua across a resistance 83, is connected to a diode 82 which controls, via the connection 87, the flip-flop 45. A condenser 85 is connected in parallel to the emitter base junction of the transistor 84 and filters out parasitic current via the locking gate 46 to prevent accidental disturbances from coming from the feed source Ua and/or from the connection with the switch 8, 10.

In the case of the time-interval comparator 7 which controls the two first transmission ratios, the locking gate 46 comprises a supplementary resistance 89 shown in broken lines, which connects the complementary output 94 of the flip-flop 45 with the base of the transistor 84.

When the switch 8, 10 is open, the resistances 86 and 88 feed the base of the transistor 84, which is conductive. Its low saturation voltage polarizes in reverse direction the diode 82 which, by locking of the connection 87, permits functioning of the flip-flop 45 starting from the information of the time generator/comparator 42.

In the case of the comparator 11 which controls the second and third transmission ratios, closure of the switch 10 by connecting the common point of the resistance 86 and 88 to ground cancels the base current of the transistor 84 and locks it. The transistor 79 of the flip-flop 45, whose base-to-emitter junction is then fed under the Ua voltage over the channel formed by the resistance 83 and the passing diode 82, becomes saturated, causing blocking of the transistor 72 through the intermediary of the crossed base-to-collector connections formed by the resistances 74 and 76. As a result, the output terminal 50 is positioned in the "high" state corresponding to the second ratio of the transmission.

In the case of the time-interval comparator 7 which controls the first and second transmission ratios, closure of the switch 8 does not necessarily cause blocking of the transistors 84 and 72 and saturation of 79, since the connection 49 can keep the transistor 84 saturated by the resistance 89 when the flip-flop 45 is in the state of the second transmission ratio corresponding to a "high" signal on the terminal 94 and permits control of the flip-flop 45 starting from the information of the time generator/comparator 42. Conversely, when the output terminal 94 of the flip-flop 45 passes to the "low" state, when the first ratio is engaged, it frees the transistor 84 whose state now depends only on the position of the switch 8. When it is closed, the state of first speed corresponding to the transistor 79 being saturated and the transistor 72 blocked, is maintained by blocking of the transistor 84. When it is open, functioning of the flip-flop 45 is freed by the saturation of the transistor 84, and the flip-flop 45 can then become positioned in the state of the first or of the second ratio according to the order sent by the time generator/comparator 42.

In order to complete the description of the functioning of the embodiment of FIG. 9, reference may be made to FIGS. 10 to 13 each of which represents chronograms of the various operational situations.

In each of FIGS. 10 to 13, the input signals of the terminals 52 and 51 are shown as a function of time, the signals appearing in the two channels 81 and 80 and the output signal of the terminal 50.

Figure 10:
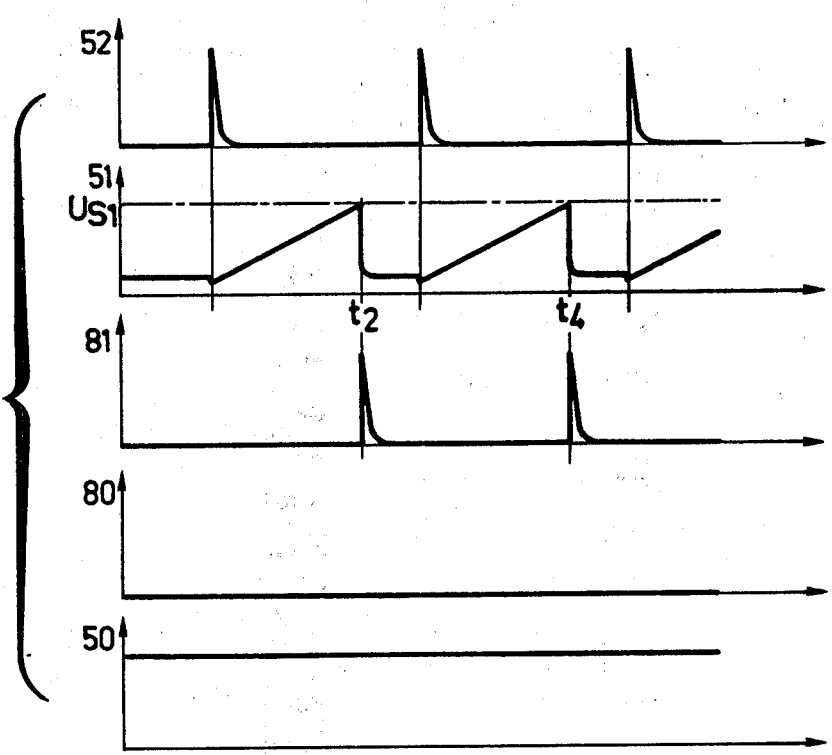

FIG. 10 shows a configuration in which the frequency of the tachometric signal applied to the terminal 52 and the amperage of the current generator 40 connected to the terminal 51 are such that, the energization threshold $US_1$ of the single junction 57 having been reached, the latter discharges the condenser 56 in the instants $t_2$ and $t_4$. The successive discharges produce pulses on the channel 81 which place the output 50 of the flip-flop 45 at the "high" level corresponding to a particular transmission ratio, for example of the order n. The channel 80 remains at the low level.

Figure 11:
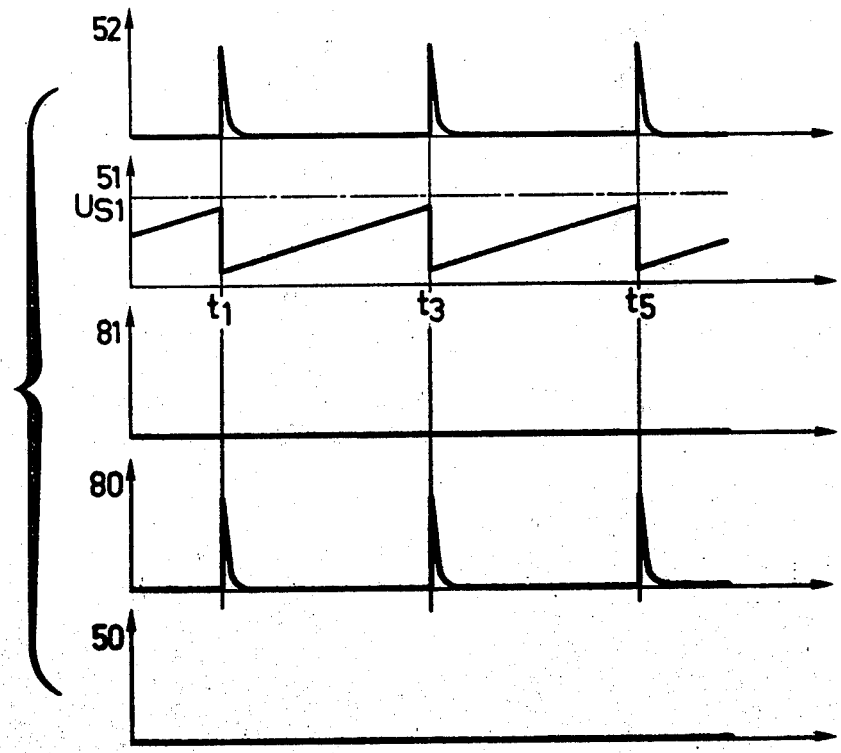

FIG. 11 shows another configuration in which the frequency of the tachometric signal applied to the terminal 52 is the same as in FIG. 10, but where the amperage of the current generator 40 has a different value, lower than in the case of FIG. 10. The motor load is therefore weaker. It is then the thyristor 54 which discharges the condenser 56 at the instants $t_1$, $t_3$ and $t_5$ preventing the voltage of the terminal 51 from reaching the energization threshold $US_1$ of the single junction 57. These successive discharges produce pulses on the channel 80 which place the output 50 of the flip-flop 45 at the "low" level corresponding to a transmission ratio of n+1. The channel 81 remains at the low level.

FIG. 12 illustrates a configuration in which the amperage of the current generator 40 has the same value as in the case of FIG. 10, but where the frequency of the tachometric signal applied to the terminal 52 is higher than in the case shown in FIG. 10. It is then the thyristor 54 which discharges the condenser 56 at the instants $t_7$, $t_9$, $t_{11}$ and $t_{13}$ preventing the voltage of the terminal 51 from reaching the energization threshold $US_1$ of the single-junction 57. The successive discharges produce pulses on the channel 80 which place the output 50 of the flip-flop 45 at the "low" level corresponding to a transmission ratio, for example, of the order of p. The channel 81 remains at the low level.

Finally, FIG. 13 illustrates a configuration in which the frequency of the tachometric signal and the amperage of the current generator 40 are the same as in the case of FIG. 12 but where, for example as a result of closure of the retrocontact switch 9, the energization threshold of the single-junction transistor 57 goes from the preceding value $US_1$ to the lesser value $US_2$ which, at the instants $t_6$, $t_8$, $t_{10}$ and $t_{12}$, causes the latter to be conducted and to discharge the condenser 56. These successive discharges produce pulses on the channel 81 which place the output 50 of the flip-flop 45 at the "high" level corresponding to a transmission ratio of the order of p-1. The channel 80 remains at the low level.

Figure 14:
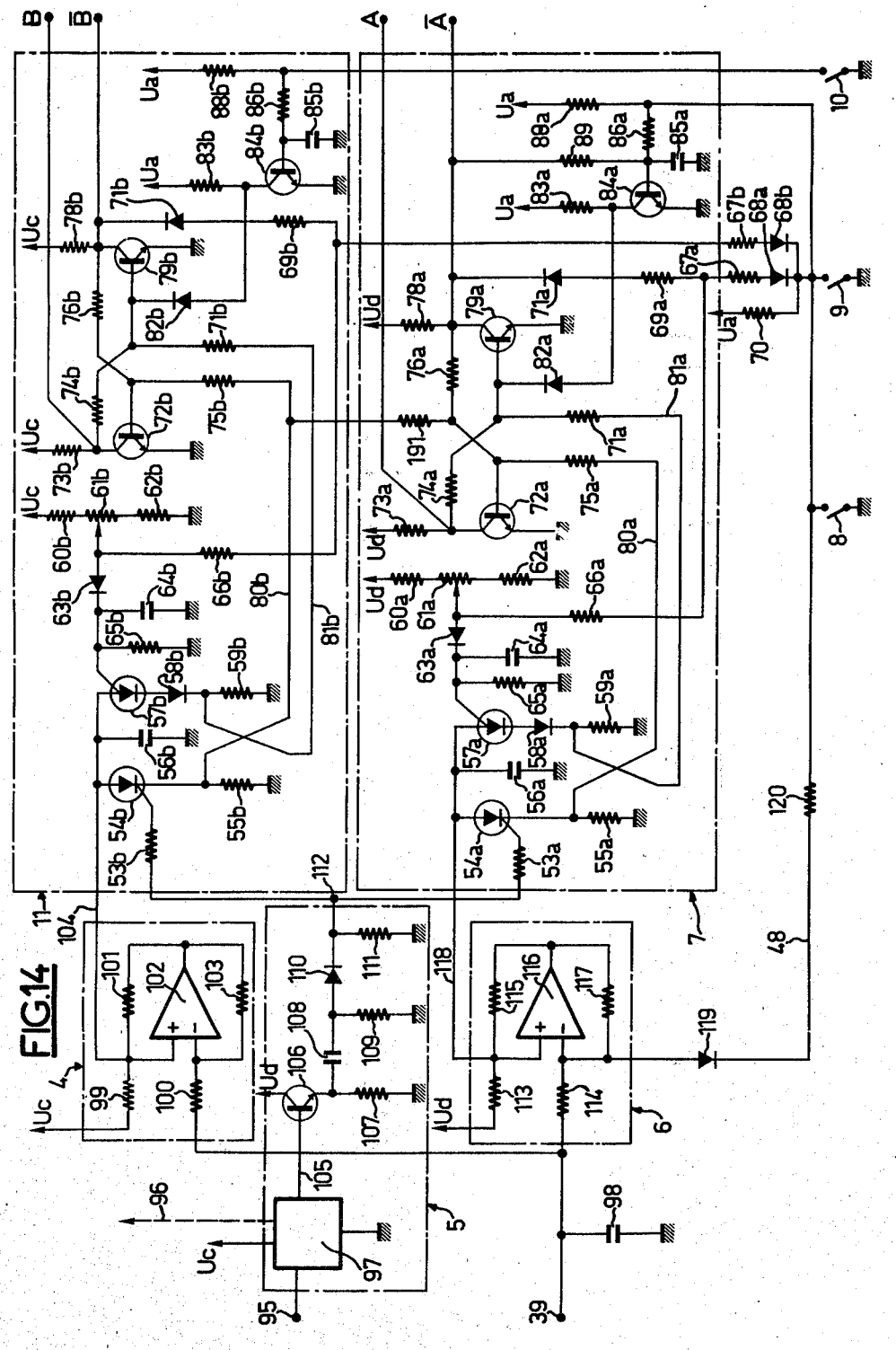
FIG. 14 is a detailed electrical diagram of the assembly of the electronic governor device of FIG. 3.

The electric governor assembly (FIG. 14).

FIG. 14 shows the detailed diagram of an electronic circuit assembly which may be used for carrying out the functions shown by the blocks 4, 5, 6, 7 and 11 of the device $G_1$ of FIG. 3. It should first be mentioned that, in order to simplify the representation of the circuit, the regulated supplies furnishing the voltages Uc and Ud from the voltage source Ua have not been shown. They are of the same type of stabilization by series resistance and Zener diode with uncoupling by condensers as that shown in FIG. 9 by the circuit comprising the elements 90 to 93. It will also be noted that the time-interval comparators 7 and 11 which have already been described with reference to FIG. 9 comprise the same elements bearing the same reference numerals as in FIG. 9, with the added indication "a" for the comparator 7 and the indication "b" for the comparator 11, except for the resistance 70 which is common to the two comparators.

The functional frequency divider and differentiator block 5 which receives on a terminal 95 speed information coming from the electronic processing circuit 3 of the pickup signal $C_2$ of FIG. 3 comprises a counter 97 which comprises a first half-frequency output which furnishes, via a connection 96, to the unit 13 of the device $G_2$ of FIG. 3, not shown in FIG. 14, a tachometric signal D of a square shape which is independent of the cyclic ratio of the speed signal applied on 95 and a second output connected to the differentiator circuit via a connection 105, whose frequency division ratio is equal to the number of teeth of the target which rotates in front of the speed pickup in such a manner that the signal applied on the connection 105, which always has a rising slope at the approach of the same tooth, has exactly the frequency corresponding to the rotational speed of the target, independently of imperfections of the indentation. The differentiator circuit comprises a NPN transistor 106 mounted as an emitter-follower impedance convertor which receives on its base directly, through the connection 105, the signal of the second output of the binary counter 97, and on its collector, the stabilized feed voltage Ud. The emitter of the transistor 106 is connected to a resistance 107 and to a condenser 108, which is connected to a resistance 109 and to an output terminal 115 through an intermediary diode 110. A resistance 111 is connected to a terminal 112 and is also connected to the resistances 107 and 108 by the ground of the circuitry. The assembly of the elements 108 to 111 forms a positive differentiator circuit which makes it possible to obtain on the input terminal of the time-interval comparators 7 and 11 positive pulses at each rising slope of the tachometric signal present on the connection 105.

The two current generators 4 and 6 receive from the terminal 39 the image voltage of the load on the motor coming from the potentiometric pickup $C_1$ which is antiparasitized by the presence of a condenser 98 between the terminal 39 and the circuitry ground.

The current generator 4 is obtained by means of an operational amplifier 102, a resistance 101 of the reaction loop, a resistance 103 of the counter-reaction loop, an input resistance 100 between the terminal 39 and the input (−) and a resistance 99 between the stabilized voltage Uc and the input (+) from which starts a connection 104 which carries the current which is a function of the voltage of the terminal 39, toward the period meter 11.

The current generator 6 is obtained by means of electronic elements 113 to 117 which fulfill the same functions as the elements 99 to 103 of the current generator 4 but which further comprise the connection 48 connecting the common point of resistances 114 and 117 and of the input (−) of an operational amplifier 116 to the switch 8, imposing the first transmission ratio across the series association of a diode 119 and a resistance 120. A connection 118 to the input (+) of the amplifier 116 conducts the output current toward the comparator 7. The value of the current is a function of the voltage of the terminal 39 when the switch 8 is open and practically constant when the switch 8 is closed.

Finally, the presence will be noted of a resistance 191 placed between a control connection 80b of the flip-flop of the comparator 11 and the base of a transistor 72a of the flip-flop of the comparator 7. When the vehicle speed increases, the amplitude of the control pulses produced by way of discharge 80a of a condenser 56a comprising a thyristor 54a diminishes and the pulses may no longer be high enough to restore the flip-flop 72a, 79a of the comparator 7 into the good position following an accidental change in condition, due, for example, to the presence of interferences or to a cut-off of the feed voltage. The connection through the resistance 191 makes it possible to restore the second state of the flip-flop of the comparator 7 controlling the change of the two first transmission ratios by the pulse coming from the discharge channel of a condenser 56b through a thyristor 54b of the comparator 11 controlling the shift for the two last transmission ratios since, as a result of the deviation between the speed thresholds of the two comparators 7 and 11, the amplitude of these pulses remains sufficiently within the speed limits of the vehicle to control the two flip-flops.

Figure 15:
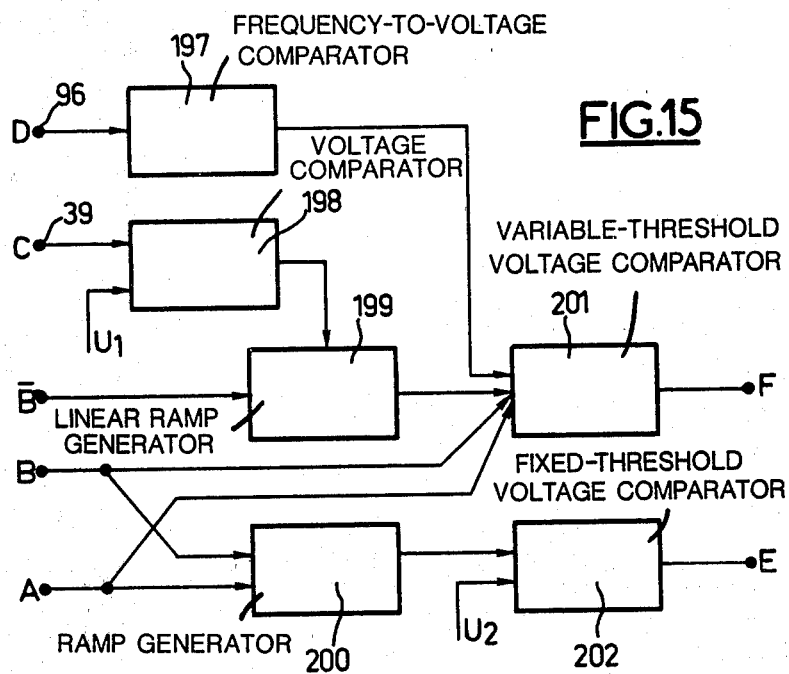
FIG. 15 is a generalized block diagram of a first embodiment of a control circuit which may be employed in the sequential control device of FIG. 3.
Figure 16:
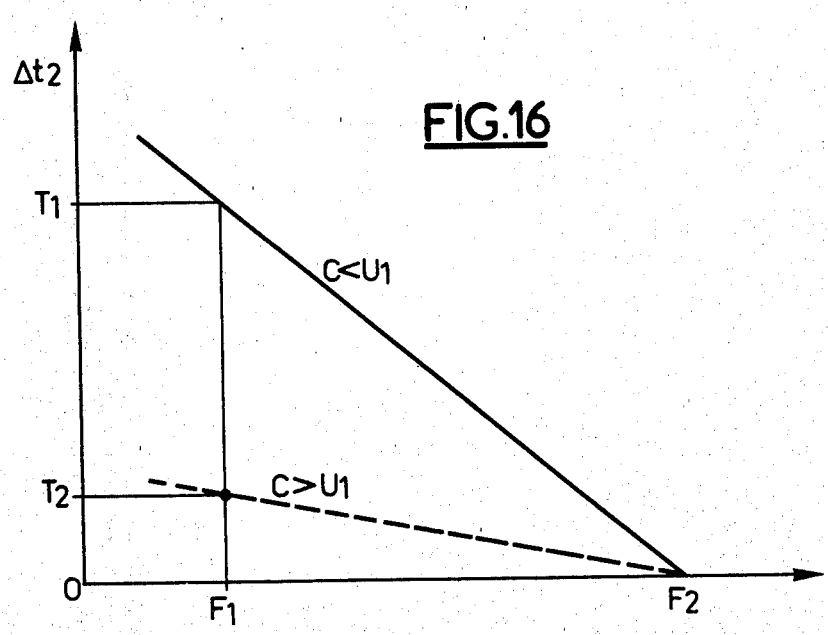
FIG. 16 is a curve illustrating the time delay $\Delta t_2$ obtained by the device of FIG. 15 as a function of the input frequency corresponding to the speed of the vehicle for two values of the signal C as a function of the position of the accelerator pedal.

First embodiment of control circuit for sequential control device (FIGS. 15 and 16).

The sequential commutation device $G_2$ of FIGS. 1 and 3 which comprises the functional units 12 and 15 has already been the subject of a previous description in the French patent application No. 78 28436 of applicant, filed October 4, 1978 entitled "Sequential commutation device for the control of an automatic transmission", and reference may be had to it for greater detail. The corresponding U.S. application, Ser. No. 79,918 has been filed Sept. 28, 1979, now U.S. Pat. No. 4,290,324. However, the two proposed circuits are succinctly recapitulated in FIGS. 15 and 16, and in FIGS. 17 and 18.

In the embodiment of FIG. 15, the output signal E which controls the electrically actuated valve $EL_1$ controlling the shift between the two first transmission ratios across the power amplifier 17 of FIG. 3 is obtained by a ramp generator 200 receiving the output signals A and B of the two comparators 7 and 11 of FIG. 3 and a voltage comparator 202 with a fixed threshold $U_2$ which produces the logic combination of the processing circuit 15 of FIG. 3 and insures functioning of the time delay constant $\Delta t_1$ of the order of a few hundredths of a second shown by the chronograms of FIG. 5. The output signal F which controls the electrically actuated valve $EL_2$ controlling the shift between the two last transmission ratios across the power amplifier 16 is obtained by a linear ramp generator 199 receiving the complement B of the output signal B of the comparator 11 and the bias control coming from a voltage comparator 198 with a fixed threshold $U_1$ which detects the tension level of the signal C as a function of the position of the accelerator pedal appearing on the terminal 39 and by a variable-threshold voltage comparator 201 receiving the output signal of the ramp generator 199, the signal A, the signal B, and the threshold voltage variable as a function of the frequency of the signal D appearing at the vehicle speed image terminal 96 which comes from the frequency-to-voltage converter 197.

This arrangement makes it possible to obtain the logic combination of the processing circuit 14 of FIG. 3 and the time delay function $\Delta t_2$ shown by the chronograms of FIG. 5. In practice, the threshold voltage $U_1$ is fixed so that the voltage C is lower than $U_1$ when the driver steps on the accelerator and higher than $U_1$ when he raises his foot.

In automatic driving, when the selection lever is in A position, when the driver steps on the accelerator ($C<U_1$) the time delay $t_2$ shown in FIG. 16 in the form of the curve in full lines, decreases when the frequency of the vehicle speed image signal D increases. When the driver has his foot raised ($C>U_1$), the governor $G_1$ of FIGS. 1 and 3 supplies a signal B of passage from the third to the second transmission ratio at the fixed frequency $F_1$ such that the time delay then obtained starting from the curve shown in broken lines in FIG. 16, is $T_2$.

In manual driving, when the driver moves the ratio selection lever from the position A to the position 2 (third speed prohibited), the value of the time delay $\Delta t_2$ is obtained either on the curve in full lines if the driver steps on the accelerator ($C<U_1$), or on the curve in broken lines if the driver's foot is raised ($C>U_1$). The time delay $\Delta t_2$ may vary from O to $T_1$ according to the value of the vehicle speed corresponding to a frequency of the signal D comprised between the frequencies $F_1$ and $F_2$ at the moment of the manual change-over. It will be noted that the duration $\Delta t_2$ is in practice very short, $T_1$ being of the order of a few tenths of a second.

Figure 17:
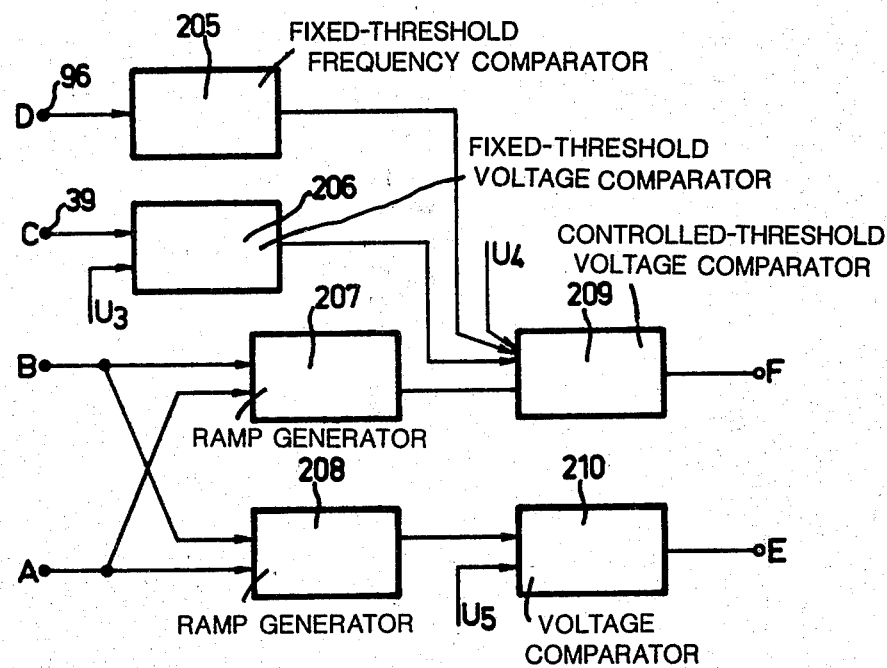
FIG. 17 is a generalized block diagram of a second embodiment of a control circuit which may be employed in the sequential control device of FIG. 3.
Figure 18:
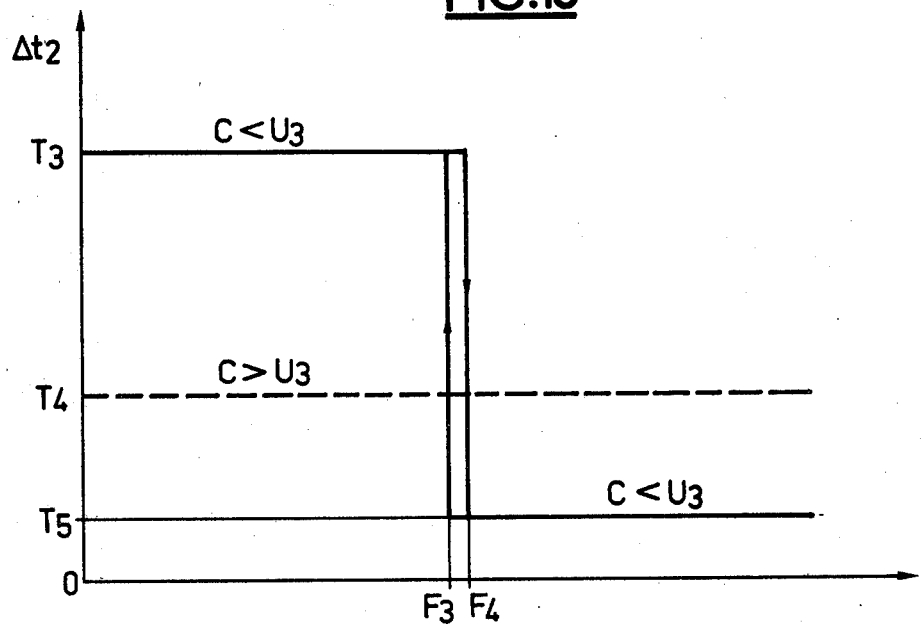
FIG. 18 is a curve illustrating the three time delay levels $\Delta t_2$ obtained by the device of FIG. 17 as a function of the input frequency corresponding to the speed of the vehicle for two values of the signal C as a function of the position of the accelerator pedal.

Second embodiment of control circuit for sequential control device (FIGS. 17 and 18).

FIG. 17 is a generalized block diagram of another embodiment of the device $G_2$ of FIGS. 1 and 3 in which the signal E is obtained by a ramp generator 208 receiving input signals A and B and a voltage comparator 210 with a fixed threshold $U_5$. These two elements constitute the logic combination of the signals A and B and insure the time delay function $\Delta t_1$ of the process circuit 15 of FIG. 3. The signal F is obtained by a ramp generator 207 receiving the input signals A and B and by a controlled-threshold voltage comparator 209 receiving the output signal of the ramp generator 207, the fixed-threshold voltage $U_4$ modified by the threshold control coming from a fixed-threshold voltage comparator 206 which keeps count of the signal C and by a threshold control coming form a fixed-thresholds frequency comparator 205 keeping count of the frequency of the signal D.

This arrangement makes it possible to obtain the logic combination of the processing circuit 14 of FIG. 3 and the three-level time delay function $\Delta t_2$ shown in FIG. 18 by the curve in solid lines when the driver steps on the accelerator ($C<U_3$) and by the curve in broken lines when he has his foot raised ($C>U_3$). Instead of obtaining a continuous variation of the time delay $\Delta t_2$ as on the curve of FIG. 16, one is here content with an approximation which, as a counterpart, allows simplification of the electronic circuit by utilizing, in order to obtain the function of the fixed-thresholds frequency comparator 205 ($F_3$ and $F_4$ of FIG. 18), a device of the same type as that comprising the units 42 and 45 of FIG. 9. The three circuits thus unified can be advantageously reproduced in modular form, for example by utilizing the techniques of thin-layer or thick-layer hybrid circuits.

Figure 19:
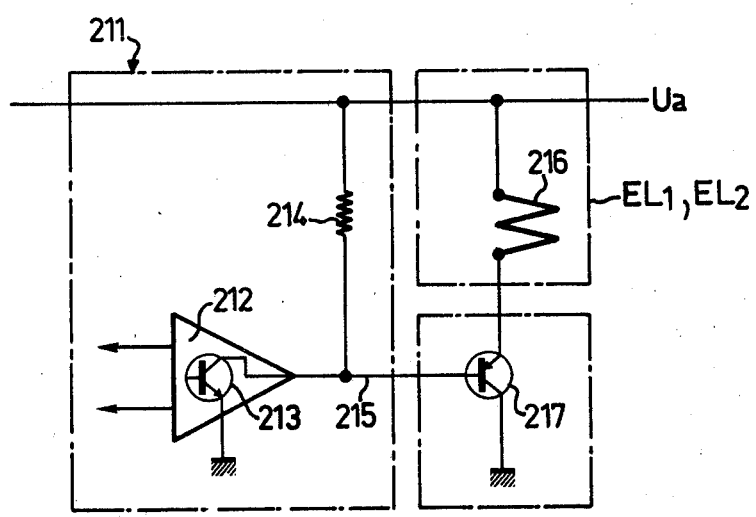
FIG. 19 is a detailed electrical diagram of an embodiment of the power stages controlling the electrically activated values of the hydraulic device.

The power stages for the electrically actuated valves of the hydraulic device (FIG. 19).

The power stages 16 and 17 of FIG. 3 are obtained in the same manner as shown in FIG. 19, by a PNP power transistor 217 whose charge, placed between its emitter and the feed source Ua, comprises a coil 216 of the electrically actuated valve $EL_1$ controlling the shifts between the two first transmission ratios, or of the electrically actuated valve $EL_2$ which controls the shifts between the two last ratios. The base of the transistor 217 is connected to an output 215 of a functional block 211 corresponding to the final stage of the processing circuits 14 and 15 of FIG. 3 obtained in similar manner by an operational amplifier 212 which has an NPN transistor with open collector 213 fed by the voltage Ua across a resistance 214. Further, the collector of the transistor 217 is connected to the ground of the circuitry.

This arrangement has several advantages. It facilitates cooling of the power transistors 217, since the two collectors which generally are electrically connected to the radiators of the transistors are disposed without particular precautions on the same thermic dissipator which may be in contact with the mass of the vehicle. No recuperator diode is required any longer in parallel on the electrogate $EL_1$ or $EL_2$ to insure protection of the transistors 217, for, when the current in the electrically actuated valve is cut off, the excess voltage developed at its terminals by the reactance effect renders the base-emitter junction conductive and generates an emitter-base current across the resistance 214 which renders the transistor 217 conductive if the energy of the reactance is not dissipated. The inconvenience of the presence of this recuperation diode is that, in the event of voltage inversion as a result of band connection of the battery, it will short-circuit the electrically actuated valve and cause destruction of the power transistor 217. Finally, the short-circuits in the mass of connections connecting the power stages of the electronic box with the electrogates which are often far apart from each other, present no danger to the circuits of the electronic box.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. An electronic governor for an electronic control system which changes the speed ratios in an automatic transmission of an automotive vehicle having first, second, and third forward ratios with shifting under torque and one reverse mode, said transmission being controlled by a hydraulic circuit with electrically actuated control valves dependent on information relating to the operation of the vehicle and in particular on signal corresponding to: (1) the load on the motor as indicated by the position of the accelerator pedal, (2) the speed of the vehicle, (3) the position of a manual control member imposing certain transmission ratios and (4) an end-of-course retrocontact of the accelerator pedal, said electronic governor receiving the above information and supplying to a sequential commutator means a first signal for shifting from the first forward transmission ratio to the second ratio and vice versa, a second signal for shifting from the second ratio to the third ratio and vice versa, and a third signal whose frequency corresponds to the speed of the vehicle, said sequential commutator means upon receiving said signals supplying control signals for actuating said electrically actuated control valves, said electronic governor comprising first time-interval comparator means for supplying said first signal for the control of shifting from the first transmission ratio to the second ratio and vice versa, second time-interval comparator means for supplying the second signal for the control of the shifting from the second transmission ratio to the third ratio and vice versa, each said comparator means comparing the length of the period of the signal corresponding to the speed of the vehicle with the duration of the signal corresponding to the load on the motor, first current generator means connected to said switch and receiving the signal corresponding to the motor load and for sending an output signal to said first said comparator means, and second current generator means connected to the signal corresponding to the motor load and sending an output signal to the second said comparator means.

2. An electronic governor for an electronic control system which changes the speed ratios in an automatic transmission of an automotive vehicle having first, second, and third forward ratios with shifting under torque and one reverse mode, said transmission being controlled by a hydraulic circuit with electrically actuated control valves dependent on information relating to the operation of the vehicle and in particular on signal corresponding to: (1) the load on the motor as indicated by the position of the accelerator pedal, (2) the speed of the vehicle, (3) the position of a manual control member imposing certain transmission ratios and (4) an end-of-course retrocontact of the accelerator pedal, said electronic governor receiving the above information and supplying to a sequential commutator means a first signal for shifting from the first forward transmission ratio to the second ratio and vice versa, a second signal for shifting from the second ratio to the third ratio and vice versa, and a third signal whose frequency corresponds to the speed of the vehicle, said sequential commutator means upon receiving said signals supplying control signals for actuating said electrically actuated control valves, said electronic governor comprising first time-interval comparator means for supplying said first signal for the control of shifting from the first transmission ratio to the second ratio and vice versa, second time-interval comparator means for supplying the second signal for the control of the shifting from the second transmission ratio to the third ratio and vice versa, each said comparator means comparing the length of the period of the signal corresponding to the speed of the vehicle with the duration of the signal corresponding to the load on the motor, first and second switches, each controlled by the position of said manual control member, said first switch imposing the transmission to be maintained on the first transmission ratios and said second switch imposing the transmission ratios, and a third retrocontact switch engageable by the accelerator pedal, said switches making possible positive action on the two said comparators.

3. An electronic governor for an electronic control system which changes the speed ratios in an automatic transmission of an automotive vehicle having first, second, and third forward ratios with shifting under torque and one reverse mode, said transmission being controlled by a hydraulic circuit with electrically actuated control valves dependent on information relating to the operation of the vehicle and in particular on signal corresponding to: (1) the load on the motor as indicated by the position of the accelerator pedal, (2) the speed of the vehicle, (3) the position of a manual control member imposing certain transmission ratios and (4) an end-of-course retrocontact of the accelerator pedal, said electronic governor receiving the above information and supplying to a sequential commutator means a first signal for shifting from the first forward transmission ratio to the second ratio and vice versa, a second signal for shifting from the second ratio to the third ratio and vice versa, and a third signal whose frequency corresponds to the speed of the vehicle, said sequential commutator means upon receiving said signals supplying control signals for actuating said electrically actuated control valves, said electronic governor comprising first time-interval comparator means for supplying said first signal for the control of shifting from the first transmission ratio to the second ratio and vice versa, second time-interval comparator means for supplying the second signal for the control of the shifting from the second transmission ratio to the third ratio and vice versa, each said comparator means comparing the length of the period of the signal corresponding to the speed of the vehicle with the duration of the signal corresponding to the load on the motor, switch means for imposing the transmission to be maintained on the first transmission ratio, and a current generator means connected to said switch and receiving the signal corresponding to the motor load and for sending an output signal to said first said comparator means.

4. An electronic governor for an electronic control system which changes the speed ratios in an automatic transmission of an automotive vehicle having first, second, and third forward ratios with shifting under torque and one reverse mode, said transmission being controlled by a hydraulic circuit with electrically actuated control valves dependent on information relating to the operation of the vehicle and in particular on signal corresponding to: (1) the load on the motor as indicated by the position of the accelerator pedal, (2) the speed of the vehicle, (3) the position of a manual control member imposing certain transmission ratios and (4) an end-of-course retrocontact of the accelerator pedal, said electronic governor receiving the above information and supplying to a sequential commutator means a first signal for shifting from the first forward transmission ratio to the second ratio and vice versa, a second signal for shifting from the second ratio to the third ratio and vice versa, and a third signal whose frequency corresponds to the speed of the vehicle, said sequential commutator means upon receiving said signals supplying control signals for actuating said electrically actuated control valves, said electronic governor comprising first time-interval comparator means for supplying said first signal for the control of shifting from the first transmission ratio to the second ratio and vice versa, second time-interval comparator means for supplying the second signal for the control of the shifting from the second transmission ratio to the third ratio and vice versa, each said comparator means comparing the length of the period of the signal corresponding to the speed of the vehicle with the duration of the signal corresponding to the load on the motor, and current generator means connected to the signal corresponding to the motor load and sending an output signal to the second said comparator means.

5. An electronic governor for an electronic control system which changes the speed ratios in an automatic transmission of an automotive vehicle having first, second, and third forward ratios with shifting under torque and one reverse mode, said transmission being controlled by a hydraulic circuit with electrically actuated control valves dependent on information relating to the operation of the vehicle and in particular on signal corresponding to: (1) the load on the motor as indicated by the position of the accelerator pedal, (2) the speed of the vehicle, (3) the position of a manual control member imposing certain transmission ratios and (4) an end-of-course retrocontact of the accelerator pedal, said electronic governor receiving the above information and supplying to a sequential commutator means a first signal for shifting from the first forward transmission ratio to the second ratio and vice versa, a second signal for shifting from the second ratio to the third ratio and vice versa, and a third signal whose frequency corresponds to the speed of the vehicle, said sequential commutator means upon receiving said signals supplying control signals for actuating said electrically actuated control valves, said electronic governor comprising first time-interval comparator means for supplying said first signal for the control of shifting from the first transmission ratio to the second ratio and vice versa, second time-interval comparator means for supplying the second signal for the control of the shifting from the second transmission ratio to the third ratio and vice versa, each said comparator means comparing the length of the period of the signal corresponding to the speed of the vehicle with the duration of the signal corresponding to the load on the motor, and said sequential commutator means comprising a first processing circuit equipped with a ramp generator which receives the shift signals issuing from the electronic governor and is connected to a fixed-threshold voltage comparator defining the first control signal for the first electrically actuated valve with a constant time-delay.

6. An electronic governor for an electronic control system which changes the speed ratios of an automatic transmission of an automotive vehicle having first, second, and third forward ratios with shifting under torque and one reverse mode, said transmission being controlled by a hydraulic circuit with electrically actuated control valves dependent on information relating to the operation of the vehicle and in particular on signal corresponding to: (1) the load on the motor as indicated by the position of the accelerator pedal, (2) the speed of the vehicle, (3) the position of a manual control member imposing certain transmission ratios and (4) an end-of-course retrocontact of the accelerator pedal, said electronic governor receiving the above information and supplying to a sequential commutator means a first signal for shifting from the first forward transmission ratio to the second ratio and vice versa, a second signal for shifting from the second ratio to the third ratio and vice versa, and a third signal whose frequency corresponds to the speed of the vehicle, said sequential commutator means upon receiving said signals supplying control signals for actuating said electrically actuated control valves, said electronic governor comprising first time-interval comparator means for supplying said first signal for the control of shifting from the first transmission ratio to the second ratio and vice versa, second time-interval comparator means for supplying the second signal for the control of the shifting from the second transmission ratio to the third ratio and vice versa, each said comparator means comparing the length of the period of the signal corresponding to the speed of the vehicle with the duration of the signal corresponding to the load on the motor, and two power stages receiving respectively the output signals issuing from the sequential commutator means, each of said power stages comprising a power transistor whose charge, placed between its emitter and its feed source, is the coil of the respective electrically actuated valve, its collector being connected to circuit ground and its base at the output of an amplifier with the interposition of a resistance mounted in parallel and connected to the feed source.

7. An electronic control unit for an automatic transmission of an automotive vehicle having first, second and third forward drive, said control unit receiving information signals relating to the operation of the vehicle and corresponding to (1) the load on the motor and (2) the speed of the vehicle, said control unit comprising:

first time-interval comparator means for supplying a first signal for the control of shifting from the first forward drive to the second forward drive and vice versa, second time-interval comparator means for supplying a second signal for the control of the shifting from the second forward drive to the third forward drive and vice-versa, each said comparator means comparing the length of the period of the signal corresponding to the speed of the vehicle with the duration of the signal corresponding to the load on the motor, and a pair of current generator means connected to the signal corresponding to the motor load and sending an output signal respectively to said first and second time-interval comparator means.

8. The electronic governor of any of claims 2 to 4, wherein the motor has a carburetor and a butterfly valve mounted on a shaft, said governor including a pickup means for the position of the accelerator pedal, comprising a potentiometer rotationally driven by the butterfly shaft.

9. The electronic governor of claim 5 wherein the sequential commutator means comprises a second processing circuit equipped with a linear ramp generator which receives the inverse signal of the second shift threshold signal issuing from the electronic governor device and a signal coming from a fixed-threshold voltage comparator fed by the motor load signal as a function of the position of the accelerator pedal, so as to define the bias of the generated ramp.

10. The electronic governor of claim 9 wherein the second processing circuit further comprises a variable-threshold voltage comparator receiving an image voltage from the frequency of the signal corresponding to the speed of the vehicle, the output signal of said linear ramp generator and the first and second shift threshold signals issuing from the electronic governor.

11. The electronic control device in accordance with claim 5 wherein the sequential commutator means comprises a second processing circuit equipped with a ramp generator which receives the two shift threshold signals issuing from the electronic governor.

12. The electronic governor of claim 11 wherein the sequential commutator means further comprises
a fixed-threshold frequency comparator which receives said third signal corresponding to the speed of the vehicle, and
controlled-threshold voltage comparator means which receives the output signal of said ramp generator; a fixed-threshold voltage comparator which receives the motor load signal corresponding to the position of the accelerator pedal; said controlled-threshold voltage comparator receiving also the output signal of said fixed-threshold voltage comparator and the output signal of said fixed-threshold frequency comparator.

13. The electronic control unit of claim 7 comprising a pair of current generator means connected to the signal corresponding to the motor load and sending an output signal respectively to said first and second time-interval comparator means.

14. The electronic governor of either of claims 7 or 13, wherein the motor has a carburetor and a butterfly valve mounted on a shaft, said governor including a pickup means for the position of the accelerator pedal, comprising a potentiometer rotationally driven by the butterfly shaft.

15. The electronic governor of claim 1 or claim 7 comprising,
a displacement pickup having a toothed rotating ferromagnetic member whose rotation varies with the speed of the vehicle, and
an induction coil placed near said rotating member and supplied with high frequency alternating current,
said pickup having means for carrying out positive detection of vehicle speed followed by a non-reversing amplification.

16. The electronic governor of claim 15 comprising
a treatment circuit associated with said displacement pickup and comprising
integrator means for furnishing the mean value of an amplified low-frequency signal,
a differential amplifier with two inputs fed respectively by said amplified low-frequency signal and by said mean value, and
threshold detection means connected to the differential amplifier for supplying a rectangular signal.

17. The electronic governor in accordance with claim 15 comprising frequency divider and differentiator means for receiving information on the vehicle speed, connected to the two said comparator means, the frequency division ratio being equal to the number of teeth of said toothed rotating member, so as to eliminate the possible influence of imperfections in the teeth.

18. The electronic governor of claim 1 or claim 7, comprising
a displacement pickup having a toothed, crenelated ferromagnetic rotating member whose rotation is representative of the speed of the vehicle, and
a permanent magnet in contact with a core of soft iron to provide an assembly, partially covered by a winding, located near the crenelations of said rotating member with a slight gap, so as to obtain in the winding an electromotive induction power.

19. The electronic governor of claim 18 comprising
a treatment circuit associated with said displacement pickup and comprising
integrator means for furnishing the mean value of an amplified low-frequency signal,
a differential amplifier with two inputs fed respectively by said amplified low-frequency signal and by said mean value, and
threshold detection means connected to the differential amplifier for supplying a rectangular signal.

20. The electronic governor in accordance with claim 18 comprising frequency divider and differentiator means for receiving information on the vehicle speed, connected to the two said comparator means, the frequency division ratio being equal to the number of teeth of said toothed rotating member, so as to eliminate the possible influence of imperfections in the teeth.

21. The electronic governor of claim 1 or claim 7 wherein each said time-interval comparator means comprises
threshold generating means for generating a voltage signal,
a current generating means controlled by the signal corresponding to the load on the motor,
time comparator means capable of self generating a signal proportional to the voltage supplied by said threshold generating means and inversely proportional to the amperage of said current generating means, said time comparator means comparing the period of the vehicle speed signal with the duration of said self generated signal, and
a flip-flop memorizing the result of the comparison.

22. The electronic governor of claim 21 in which each said time-interval comparator means further comprises
a diode connected to said flip-flop, and
a blocking gate for imposing the output level of said flip-flop, said blocking gate comprising
a transistor whose base is connected to one of said switches and controlling the state of said diode so as to block its operation in accordance with the position of said switch and eventually of the state of the complementary output of the flip-flop.

23. The electronic governor in accordance with claim 22 wherein said first time-interval comparator means further comprises a connection between the switch imposing the first transmission ratio and the current generator connected to the pickup means of the motor load which imposes the value of the produced amperage.

24. The electronic governor in accordance with claim 21 wherein said first time-interval comparator means further comprises a connection between the switch imposing the first transmission ratio and the current generating means connected to the pickup means of the motor load which imposes the value of the produced amperage.

25. The electronic governor in accordance with claim 21 wherein said time comparator means comprises:
- a condenser charged by a signal coming from the current generator, controlled by the signal corresponding to the load on the motor and being able to be discharged into two different channels,
- the first such channel comprising a strong current-maintenance thyristor actuated at each period of the signal corresponding to the speed of the vehicle,
- the second such channel comprising a programmable single-junction transistor with low current maintenance which becomes conductive each time that the charge voltage of the condenser reaches a starting voltage defined by the threshold generator, each of the channels being connected to a control input of the flip-flop.

26. The electronic governor of claim 25 wherein the threshold generating means comprises an adjustable voltage divider connected to the gate of said single-junction transistor.

27. The electronic governor of control device in accordance with claim 25 further comprising a hysteresis control device having a diode which connects the complementary output of said flip-flop to the theshold generating means, so as to increase the value of the starting voltage of said single-junction transistor, thus causing the speed shift threshold to pass from the value corresponding to the rise of the speed ratios to the value corresponding to the retrogradation of the speed ratios.

28. The electronic governor in accordance with claim 21 wherein the respective flip-flops of the two said time-interval comparator means are connected together so that the control pulses of the flip-flop of said second time-interval comparator means also controls the first said time-interval comparator means in the event that the control pulses of the latter should be of a predetermined low amplitude.

* * * * *